United States Patent
Qiao et al.

(10) Patent No.: US 12,379,445 B2
(45) Date of Patent: Aug. 5, 2025

(54) LOCATION MANAGEMENT

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Taehun Kim, Fairfax, VA (US); Jinsook Ryu, Oakton, VA (US); Peyman Talebi Fard, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 500 days.

(21) Appl. No.: 17/952,421

(22) Filed: Sep. 26, 2022

(65) Prior Publication Data

US 2023/0022005 A1 Jan. 26, 2023

Related U.S. Application Data

(63) Continuation of application No. PCT/US2021/023816, filed on Mar. 24, 2021.
(Continued)

(51) Int. Cl.
*H04W 24/00* (2009.01)
*G01S 5/00* (2006.01)
*H04W 36/32* (2009.01)

(52) U.S. Cl.
CPC ......... *G01S 5/0036* (2013.01); *H04W 36/322* (2023.05)

(58) Field of Classification Search
CPC ............... G01S 5/0036; H04W 36/322; H04W 36/0033; H04W 64/00
(Continued)

(56) References Cited

U.S. PATENT DOCUMENTS 6,385,452 B1    5/2002  Zadeh et al.
8,942,660 B2    1/2015  Edge et al.
                (Continued)

FOREIGN PATENT DOCUMENTS

AU       762123 B2     6/2003
CA     2 480 348 C    10/2003
                (Continued)

OTHER PUBLICATIONS

3GPP TR 22.872 V16.1.0 (Sep. 2018); Technical Report; 3rd Generation Partnership Project; Technical Specification Group Services and System Aspects; Study on positioning use cases; Stage 1; (Release 16).
(Continued)

*Primary Examiner* — Amancio Gonzalez
(74) *Attorney, Agent, or Firm* — Peter Flanagan; Kavon Nasabzadeh; Jacob L. Mangan

(57) ABSTRACT

A second access and mobility management function (AMF) may receive a first message having positioning capability information indicating that a location management component (LMC) supports one or more positioning types. The second AMF may receive, from a first AMF, a second message indicating a positioning type of a wireless device. The second AMF may determine the LMC based on the positioning type and the positioning capability information. The second AMF may send, to a base station associated with the LMC, a third message having an identifier of the LMC.

20 Claims, 29 Drawing Sheets

Related U.S. Application Data

(60) Provisional application No. 63/000,845, filed on Mar. 27, 2020.

(58) Field of Classification Search
USPC .................................................... 455/456.1
See application file for complete search history.

(56) References Cited

U.S. PATENT DOCUMENTS

| | | | |
|---|---|---|---|
| 9,179,387 | B2 | 11/2015 | Hedqvist et al. |
| 9,307,454 | B2 | 4/2016 | Edge |
| 9,894,575 | B2 | 2/2018 | Masini et al. |
| 10,034,205 | B2 | 7/2018 | Kazmi et al. |
| 11,134,361 | B2* | 9/2021 | Fischer ................. G01S 5/0295 |
| 11,206,595 | B2* | 12/2021 | Edge ...................... H04W 4/029 |
| 11,451,926 | B2* | 9/2022 | Edge ..................... H04W 16/28 |
| 11,477,613 | B2* | 10/2022 | Bao ........................ H04L 5/0048 |
| 11,570,789 | B2* | 1/2023 | Opshaug ........... H04W 72/1268 |
| 11,658,855 | B2* | 5/2023 | Opshaug ............... G01S 5/0236 370/329 |
| 11,770,875 | B2* | 9/2023 | Akkarakaran ........ H04W 88/14 370/329 |
| 11,811,488 | B2* | 11/2023 | Edge ........................ H04W 4/90 |
| 11,844,142 | B2* | 12/2023 | Ying ...................... H04W 48/16 |
| 12,022,423 | B2* | 6/2024 | Akkarakaran ........ H04W 88/08 |
| 12,041,578 | B2* | 7/2024 | Edge ...................... H04L 5/0051 |
| 12,114,229 | B2* | 10/2024 | Edge ...................... H04W 12/06 |
| 2012/0225647 | A1 | 9/2012 | Nishida et al. |
| 2014/0135013 | A1 | 5/2014 | Xiao et al. |
| 2019/0053010 | A1 | 2/2019 | Edge et al. |
| 2021/0092560 | A1* | 3/2021 | Bao ........................ G01S 5/0236 |
| 2021/0105867 | A1* | 4/2021 | Akkarakaran .... H04W 56/0005 |
| 2022/0221548 | A1* | 7/2022 | Shreevastav .......... H04W 48/14 |
| 2022/0277657 | A1* | 9/2022 | Xiang ...................... G08G 5/22 |
| 2024/0244580 | A1* | 7/2024 | Edge .......................... G01S 5/12 |

FOREIGN PATENT DOCUMENTS

| | | |
|---|---|---|
| CN | 100388860 C | 5/2008 |
| CN | 101931863 A | 12/2010 |
| CN | 101990177 A | 3/2011 |
| CN | 101998572 A | 3/2011 |
| CN | 101998626 A | 3/2011 |
| CN | 102333351 A | 1/2012 |
| CN | 103916919 A | 7/2014 |
| EP | 2 890 163 B1 | 9/2016 |
| KR | 20120123434 A | 11/2012 |
| KR | 101265108 A | 5/2013 |
| WO | 99/22546 A1 | 5/1999 |
| WO | 99/23850 A1 | 5/1999 |
| WO | 00/28759 A1 | 5/2000 |
| WO | 01/05185 A1 | 1/2001 |
| WO | 2010/033410 A1 | 3/2010 |
| WO | 2010/105558 A1 | 9/2010 |
| WO | 2011/020375 A1 | 2/2011 |
| WO | 2011/099909 A1 | 8/2011 |
| WO | 2015/042923 A1 | 4/2015 |
| WO | 2020/001128 A1 | 1/2020 |

OTHER PUBLICATIONS

3GPP TS 23.273 V16.2.0 (Dec. 2019); Technical Specification; 3rd Generation Partnership Project; Technical Specification Group Services and System Aspects; 5G System (5GS) Location Services (LCS); Stage 2; (Release 16).
3GPP TR 23.731 V16.0.0 (Dec. 2018); Technical Report; 3rd Generation Partnership Project; Technical Specification Group Services and System Aspects; Study on Enhancement to the 5GC LoCation Services (Release 16).
3GPP TS 24.571 V1.0.0 (Dec. 2019); Technical Specification; 3rd Generation Partnership Project; Technical Specification Group Core Network and Terminals; 5G System; Control Plane Location Services (LCS) procedures; Stage 3; (Release 16).
3GPP TS 25.305 V15.0.0 (Jun. 2018); Technical Specification; 3rd Generation Partnership Project; Technical Specification Group Radio Access Network; Stage 2 functional specification of User Equipment (UE) positioning in UTRAN (Release 15).
3GPP TS 29.572 V16.1.0 (Dec. 2019); Technical Specification; 3rd Generation Partnership Project; Technical Specification Group Core Network and Terminals; 5G System; Location Management Services; Stage 3; (Release 16).
3GPP TSG-RAN WG2 Meeting #81 (R2-130694; St. Julian's, Malta, Jan. 28-Feb. 1, 2013; Change Request; 36.305; CR 0056; rev-; Current version: 11.2.0.
3GPP TS 37.355 V15.0.0 (Dec. 2019); Technical Specification; 3rd Generation Partnership Project; Technical Specification Group Radio Access Network; LTE Positioning Protocol (LPP) (Release 15).
3GPP TS 38.300 V16.0.0 (Dec. 2019); Technical Specification; 3rd Generation Partnership Project; Technical Specification Group Radio Access Network; NR; NR and NG-RAN Overall Description; Stage 2; (Release 16).
3GPP TS 38.305 V15.5.0 (Dec. 2019); Technical Specification; 3rd Generation Partnership Project; Technical Specification Group Radio Access Network; NG Radio Access Network (NG-RAN); Stage 2 functional specification of; User Equipment (UE) positioning in NG-RAN; (Release 15).
3GPP TS 38.331 V15.7.0 (Sep. 2019); Technical Specification; 3rd Generation Partnership Project; Technical Specification Group Radio Access Network; NR; Radio Resource Control (RRC) protocol specification; (Release 15).
3GPP TS 38.413 V16.0.0 (Dec. 2019); Technical Specification; 3rd Generation Partnership Project; Technical Specification Group Radio Access Network; NG-RAN; NG Application Protocol (NGAP); (Release 16).
3GPP TS 38.423 V16.0.0 (Dec. 2019); Technical Specification; 3rd Generation Partnership Project; Technical Specification Group Radio Access Network; NG-RAN; Xn application protocol (XnAP); (Release 16).
3GPP TS 38.455 V15.2.1 (Jan. 2019); Technical Specification; 3rd Generation Partnership Project; Technical Specification Group Radio Access Network; NG-RAN; NR Positioning Protocol A (NRPPa); (Release 15).
3GPP TR 38.856 V16.0.0 (Dec. 2019); Technical Report; 3rd Generation Partnership Project; Technical Specification Group Radio Access Network; Study on local NR positioning in NG-RAN; (Release 16).
3GPP TS 44.031 V15.0.0 (Jun. 2018); Technical Specification; 3rd Generation Partnership Project; Technical Specification Group Radio Access Network; Location Services (LCS); Mobile Station (MS)—Serving Mobile Location Centre (SMLC); Radio Resource LCS Protocol (RRLP); (Release 15).
R2-1903949; 3GPP TSG RAN WG2 Meeting #105bis; Xian, China, Apr. 8-12, 2019; Agenda item: 11.8.2.1; Source: Intel Corporation; Title: Supported positioning methods for NR dependent positioning; Document for: Discussion and decision.
R3-130933; 3GPP TSG-RAN WG3 #80; Fukuoka, Japan, May 20-24, 2013; Agenda Item: 18; Source: Ericsson; Title: E-CID Positioning Measurements and Handovers; Document for: Approval.
R3-131175; 3GPP TSG RAN WG3 Meeting #80; Fukuoka, Japan, May 20-24, 2013; Title: Response LS on UE Rx-Tx time difference measurement requirement under handover; Release: Rel-12; Work Item: LCS_LTE; Source: RAN WG3; to: RAN WG4.
R3-192398; 3GPP TSG-RAN3 Meeting #104; Reno, USA, May 13-17, 2019; Agenda item: 19.2; Source: CATT; Title: Position Capability Transfer over NRPPa; Document for: Discussion and Decision.
R3-192475; 3GPP TSG-RAN WG3 Meeting #104; Reno, Nevada, USA, May 13-17, 2019; Revision of R3-191328; Agenda item: 19.3; Source: Qualcomm Incorporated; Title: Transmission Measurement Function for NG-RAN Positioning; Document for: Discussion and Decision.
R3-192913; 3GPP TSG-RAN WG3 Meeting #104; Reno, USA, May 13-17, 2019; Agenda item: 19.3; Source: Nokia, Nokia Shanghai Bell; Title: Architecture impacts for UL-TDOA positioning; WID/SID: NR_pos-Core; Document for: Discussion and Decision.

(56) References Cited

OTHER PUBLICATIONS

R3-193585; 3GPP TSG-RAN WG3 Meeting #105; Ljubljana, Slovenia, Aug. 26-30, 2019; Agenda item: 19.5; Source: Qualcomm Incorporated; Title: Discussion of F1AP requirements to support positioning; Document for: Discussion and Decision.
R3-193947; 3GPP TSG-RAN WG3 Meeting #105; Ljubljana, Slovenia, Aug. 26-30, 2019; Agenda Item: 26.1; Source: CATT; Title: Discussion on RAN-LMF impacting on Xn; Document for: Discussion and Decision.
R3-193948; 3GPP TSG-RAN WG3 #105; Ljubljana, Slovenia, Aug. 26-30, 2019; Agenda Item: 26.2; Source: CATT; Title: Discussion on NG-RAN acting as LCS client; Document for: Discussion and Decision.
R3-194069; 3GPP TSG-RAN WG3 #105; Ljubljana, Slovenia, Aug. 26-30, 2019; Change Request; 38.473; CR 0279; rev 3; Current version: 15.6.0.
R3-194172; 3GPP TSG-RAN WG3 Meeting #105; Ljubljana, Aug. 26-30, 2019; Agenda Item: 19.5; Source: Ericsson; Title: NR uplink positioning for split gNB; Document for: Approval.
R3-194173; 3GPP TSG-RAN WG3 #105; Ljubljana, Aug. 26-30, 2019; Agenda Item: 19.5; Source: Ericsson; Title: How to Support Positioning Measurements in F1AP; Document for: Approval.
R3-194177; 3GPP TSG-RAN WG3 #105; Ljubljana, Slovenia, Aug. 26-30, 2019; Agenda Item: 26.2; Source: Ericsson; Title: Positioning Server Functionality and the NG-RAN; Document for: Approval.
R3-194178; 3GPP TSG-RAN WG3 #105; Ljubljana, Slovenia, Aug. 26-30, 2019; Agenda Item: 26.3; Source: Ericsson; Title: Positioning Client Functionality in NG-RAN; Document for: Approval.
R3-194268; 3GPP TSG-RAN3 Meeting #105; Ljubljana, Slovenia, Aug. 26-30, 2019; Change Request; 38.470; CR 0049; rev; Current version: 15.6.0.
R3-194270; 3GPP TSG-RAN3 Meeting #105; Ljubljana, Slovenia, Aug. 26-30, 2019; Title: Discussion on F1 support for positioning; Source: Huawei; Agenda item: 19.5; Document for: Discussion.
R3-194274; 3GPP TSG-RAN3 Meeting #105; Ljubljana, Slovenia, Aug. 26-30, 2019; Title: Discussion on Local LMF; Source: Huawei; Agenda item: 26.2; Document for: Discussion.
R3-195391; 3GPP TSG-RAN WG3 #105bis; Chongqing, China, Oct. 14-18, 2019; Agenda Item: 19.2; Source: CATT; Title: Discussion on NRPPa procedures; Document for: Discussion and Decision.
R3-195596; 3GPP TSG-RAN3 Meeting #105bis; Chongqing, China, Oct. 14-18, 2019; Change Request; 38.401; CR 0093; rev; Current version: 15.6.0.
R3-195824; 3GPP TSG-RAN WG3 Meeting #105bis; Chongqing, China, Oct. 14-18, 2019; Revision of R3-193587; Agenda item: 26.2; Source: Qualcomm Incorporated; Title: Comparison of 5GC-LMF and RAN-LMC based Positioning; Document for: Discussion and Decision.
R3-196613; 3GPP TSG RAN WG3 Meeting #106; Reno, USA, Nov. 18-22, 2019; Source: ZTE,Sanechips; Title: RN positioning impacts on NRPPa; Agenda item: 19.2; Document for: Discussion and Decision.
R3-197250; 3GPP TSG-RAN WG3 Meeting #106; Reno, USA, Nov. 18-22, 2019; Agenda item: 19.2; Source: Qualcomm Incorporated; Title: NRPPa functionality and procedures; Document for: Discussion and Decision.
R3-197264; 3GPP TSG-RAN WG3 #106; Reno, USA, Oct. 18-22, 2019; Agenda Item: 26.2.1; Source: CMCC; Title: Remaining aspects for Local LMF support in NG-RAN; Document for: Discussion and Decision.
R3-197278; 3GPP TSG-RAN WG3 #106; Reno, NV, USA, Nov. 18-22, 2019; Agenda Item: 19.2; Source: Ericsson; Title: Support for UL Positioning Measurements in NG-RAN; Document for: Approval.
R3-197283; 3GPP TSG-RAN WG3 #106; Reno, NV, USA, Nov. 18-22, 2019; Agenda Item: 19.5; Source: Ericsson; Title: How to Support Positioning Measurements in F1AP; Document for: Approval.
R3-197315; 3GPP TSG-RAN3 Meeting #106; Reno, U.S., Nov. 18-Nov. 22, 2019; Agenda Item: 19.4; Source: Ericsson; Title: Discussion on Delivery of Assistance Data over F1AP; Document for: Discussion and approval.
S2-2000045; SA WG2 Meeting #S2-136AH; Jan. 13-17, 2020, Incheon, South Korea; 3GPP TSG RAN Meeting #86RP-193262; Sitges, Spain, Dec. 9-12, 2019; Title: LS on Local NR positioning in NG-RAN; Response to:; Release: Rel-16; Work Item: FS_NR_LOCAL_POS.
S2-2000803; 3GPP TSG-SA WG2 Meeting #136AH; Jan. 13-17, 2020, Incheon, Korea (revision of S2-200xxxx); Source: CATT; Title: Discussion on local LMF in NG-RAN; Document for: Discussion/ Approval.
S2-2000866; SA WG2 Meeting #136AH; Incheon, South Korea, Jan. 13-17, 2020; (revision of S2-200xxxx); Source: Huawei, HiSilicon; Title: Way forward for RAN supporting LMC issue; Document for: Approval.
International Search Report of the International Searching Authority, mailed Aug. 19, 2021, in International Application No. PCT/US2021/023816.
3GPP TS 23.273 V0.4.0 (May 2019); Technical Specification; 3rd Generation Partnership Project; Technical Specification Group Services and System Aspects; 5G System Location Services (LCS); (Release 16).

* cited by examiner

RM State Transition in UE

RM State Transition in AMF

CM State Transition in UE

CM State Transition in AMF

| IE / Group Name | Presence | Range | IE type and reference | semantics description |
|---|---|---|---|---|
| position capability information | M | | ENUMERATED (support LMC connected to (R)AN, supports ECID, supports OTDOA, supports GNSS, supports WLAN, supports bluetooth, supports TBS, supports BPS, does not support position capability, LMC ID, etc.) | |

FIG. 22

```
-- ASN1START

RequestLocationInformation ::= SEQUENCE {
    criticalExtensions    CHOICE {
        c1                CHOICE {
            requestLocationInformation-r9    RequestLocationInformation-r9-IEs,
            spare3 NULL, spare2 NULL, spare1 NULL
        },
        criticalExtensionsFuture    SEQUENCE {}
    }
}

RequestLocationInformation-r9-IEs ::= SEQUENCE {
    commonIEsRequestLocationInformation    CommonIEsRequestLocationInformation
    a-gnss-RequestLocationInformation      A-GNSS-RequestLocationInformation
    otdoa-RequestLocationInformation       OTDOA-RequestLocationInformation
    ecid-RequestLocationInformation        ECID-RequestLocationInformation
    epdu-RequestLocationInformation        EPDU-Sequence                          ...,
    [[
    sensor-RequestLocationInformation-r13   Sensor-RequestLocationInformation-r13
    tbs-RequestLocationInformation-r13      TBS-RequestLocationInformation-r13
    wlan-RequestLocationInformation-r13     WLAN-RequestLocationInformation-r13
    bt-RequestLocationInformation-r13       BT-RequestLocationInformation-r13
    ]]
}

-- ASN1STOP
```

FIG. 23

T-(R)AN receive, by a second base station from a network function, a first message indicating: positioning capability information of at least one second location management component (LMC); and that a second base station is associated with the at least one second LMC

↓ receive, by the second base station from an access and mobility management function (AMF), a handover request message indicating: an identifier of a first LMC; and a positioning type;

↓ determine, by the second base station, a second LMC associated with the second base station, based on: the first message; and the second message

↓ send, by the second base station to the AMF, a handover acknowledge message indicating an identifier of the second LMC

```
receive, by a second base station from a network function, a first message
indicating: positioning capability information of at least one second location
management component (LMC); and that a second base station is associated
               with the at least one second LMC
```

⬇

```
receive, by the second base station from an access and mobility management
  function (AMF), a handover request message indicating: an identifier of a first
                      LMC; and a positioning type;
```

⬇

```
determine, by the second base station, a second LMC associated with the
second base station, based on: the first message; and the second message
```

⬇

```
send, by the second base station to the second LMC, a position information
            request message indicating an identifier of the AMF
```

FIG. 28

LOCATION MANAGEMENT

CROSS-REFERENCE TO RELATED APPLICATIONS

This application is a continuation of International Application No. PCT/US2021/023816, filed Mar. 24, 2021, which claims the benefit of U.S. Provisional Application No. 63/000,845, filed Mar. 27, 2020, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 22 is an example diagram depicting definition of a parameter/information element for the positioning capability information as per an aspect of an embodiment of the present disclosure.

FIG. 23 is an example diagram depicting a RequestLocationInformation message body as per an aspect of an embodiment of the present disclosure.

FIG. 26 is an example diagram depicting the procedures of a target base station as per an aspect of an embodiment of the present disclosure.

FIG. 28 is an example diagram depicting the procedures of a target base station as per an aspect of an embodiment of the present disclosure.

DETAILED DESCRIPTION

Example embodiments of the present invention enable implementation of enhanced features and functionalities in 5G systems. More particularly, the embodiments of the technology disclosed herein may relate to location management component (LMC) selection for handover (e.g. for 5G or future communication system). Throughout the present disclosure, UE, wireless device, vehicle terminal, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably. Throughout the present disclosure, base station, Radio Access Network (RAN), eNodeB are used interchangeably.

Figure 4:
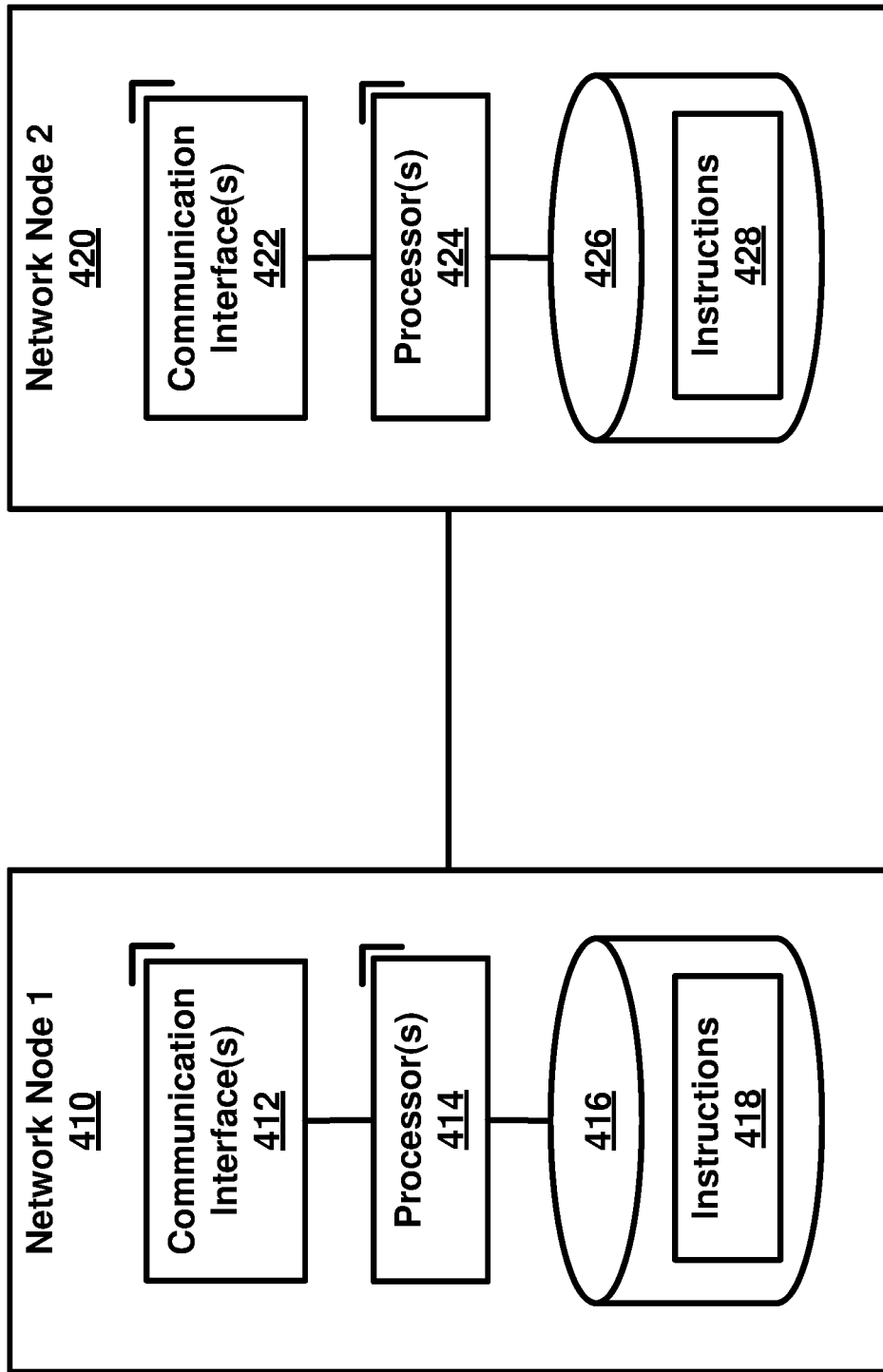
FIG. 4 is a system diagram of an example wireless device as per an aspect of an embodiment of the present disclosure.

Throughout the present disclosure, AMF, NRF, OAM, LMC, LMF, GMLC are example network functions which may be implemented either as a network element on a (dedicated) hardware, and/or a network node as depicted FIG. 4, or as a software instance running on a (dedicated) hardware and/or shared hardware, or as a virtualized function instantiated on an appropriate platform.

The following acronyms are used throughout the present disclosure:

| | |
|---|---|
| 5G | 5th generation mobile networks |
| 5GC | 5G Core Network |
| 5GS | 5G System |
| 5G-AN | 5G Access Network |
| 5QI | 5G QoS Indicator |
| ACK | Acknowledgement |
| AF | Application Function |
| AMBR | Aggregate Maximum Bit Rate |
| AMF | Access and Mobility Management Function |
| AN | Access Network |

| | |
|---|---|
| ANDSP | Access Network Discovery & Selection Policy |
| APN | Access Point Name |
| ARP | Allocation and Retention Priority |
| BD | Billing Domain |
| BPS | Barometric Pressure Sensor |
| CCNF | Common Control Network Functions |
| CDR | Charging Data Record |
| CHF | Charging Function |
| CIoT | Cellular IoT |
| CN | Core Network |
| CP | Control Plane |
| C-V2X | Cellular Vehicle-To-Everything |
| DAB | Digital Audio Broadcasting |
| DDN | Downlink Data Notification |
| DDoS | Distributed Denial of Service |
| DL | Downlink |
| DN | Data Network |
| DN-AAA | Data Network Authentication Authorization and Accounting |
| DNN | Data Network Name |
| DTMB | Digital Terrestrial Multimedia Broadcast |
| ECGI | E-UTRAN Cell Global Identifier |
| ECID | Enhanced Cell Identity |
| E-CSCF | Emergency Call Session Control Function |
| eNodeB | evolved Node B |
| EPS | Evolved Packet System |
| E-UTRAN | Evolved Universal Terrestrial Radio Access Network |
| FDD | Frequency Division Duplex |
| FQDN | Fully Qualified Domain Name |
| F-TEID | Fully Qualified TEID |
| GAD | Geographical Area Description |
| GMLC | Gateway Mobile Location Centre |
| gNB | Next Generation Node B |
| gNB-CU-CP | gNB Central Unit Control Plane |
| GNSS | Global Navigation Satellite System |
| GPSI | Generic Public Subscription Identifier |
| GTP | GPRS Tunneling Protocol |
| GUTI | Globally Unique Temporary Identifier |
| GW | Gateway |
| HGMLC | Home GMLC |
| HTTP | Hypertext Transfer Protocol |
| ID | Identifier |
| IMEI | International Mobile Equipment Identity |
| IMEI DB | IMEI Database |
| IMS | IP Multimedia Subsystem |
| IMSI | International Mobile Subscriber Identity |
| IP | Internet Protocol |
| IP-CAN | IP Connectivity Access Network |
| L2 | Layer 2 (data link layer) |
| L3 | Layer 3 (network layer) |
| LADN | Local Area Data Network |
| LAN | local area network |
| LCS | LoCation Services |
| LI | Lawful Intercept |
| LMC | Location Management Component |
| LMF | Location Management Function |
| LPP | LTE Positioning Protocol |
| LRF | location retrieval function |
| MAC | Media Access Control |
| MEI | Mobile Equipment Identifier |
| MICO | Mobile Initiated Connection Only |
| MME | Mobility Management Entity |
| MO | Mobile Originated |
| MO-LR | Mobile Originated Location Request |
| MSISDN | Mobile Subscriber ISDN |
| MT | Mobile Terminating |
| MT-LR | Mobile Terminated Location Request |
| N3IWF | Non-3 GPP InterWorking Function |
| NAI | Network Access Identifier |
| NAS | Non Access Stratum |
| NAT | Network address translation |
| NB-IoT | Narrow Band IoT |
| NCGI | NR Cell Global Identity |
| NEF | Network Exposure Function |
| NF | Network Function |
| NGAP | Next Generation Application Protocol |
| ng-eNB | Next Generation eNB |
| NG-RAN | NR Radio Access Network |
| NI-LR | Network Induced Location Request |
| NR | New Radio |
| NRF | Network Repository Function |
| NRPPA | New Radio Positioning Protocol A |
| NSI | Network Slice Instance |
| NSSAI | Network Slice Selection Assistance Information |
| NSSF | Network Slice Selection Function |
| NWDAF | Network Data Analytics Function |
| OAM | Operation Administration and Maintenance |
| OCS | Online Charging System |
| OFCS | Offline Charging System |
| OTDOA | Observed Time Difference of Arrival |
| PCC | Policy and Charging Control |
| PCF | Policy Control Function |
| PCRF | Policy and Charging Rules Function |
| PDN | Packet Data Network |
| PDU | Packet Data Unit |
| PEI | Permanent Equipment Identifier |
| PGW | PDN Gateway |
| PLMN | Public Land Mobile Network |
| ProSe | Proximity-based Services |
| QFI | QoS Flow Identifier |
| QoS | Quality of Service |
| RM | Registration Management |
| RA | Random Access |
| RAN | Radio Access Network |
| RAT | Radio Access Technology |
| RRC | Radio Resource Control |
| RM | Registration Management |
| S1-AP | S1 Application Protocol |
| SBA | Service Based Architecture |
| SEA | Security Anchor Function |
| SGW | Serving Gateway |
| SCM | Security Context Management |
| SM | Session Management |
| SMF | Session Management Function |
| SMSF | SMS Function |
| S-NSSAI | Single Network Slice Selection Assistance information |
| SS | Synchronization Signal |
| SSC | Session and Service Continuity |
| SUCI | Served User Correlation ID |
| SUPI | Subscriber Permanent Identifier |
| TA | Tracking Area |
| TAI | Tracking Area Identity |
| TBS | Terrestrial Beacon System |
| TCP | Transmission Control Protocol |
| TEID | Tunnel Endpoint Identifier |
| TMSI | Temporary Mobile Subscriber Identity |
| TNAN | Trusted Non-3GPP Access Network |
| TNGF | Trusted Non3GPP Gateway |
| TRP | Transmission and Reception Point |
| UCMF | UE radio Capability Management Function |
| UDR | Unified Data Repository |
| UDM | Unified Data Management |
| UDP | User Datagram Protocol |
| UE | User Equipment |
| UL | Uplink |
| UL CL | Uplink Classifier |
| UPF | User Plane Function |
| V2X | Vehicle-To-Everything |
| WLAN | Wireless Local Area Network |
| XML | Extensible Markup Language |

Figure 1:
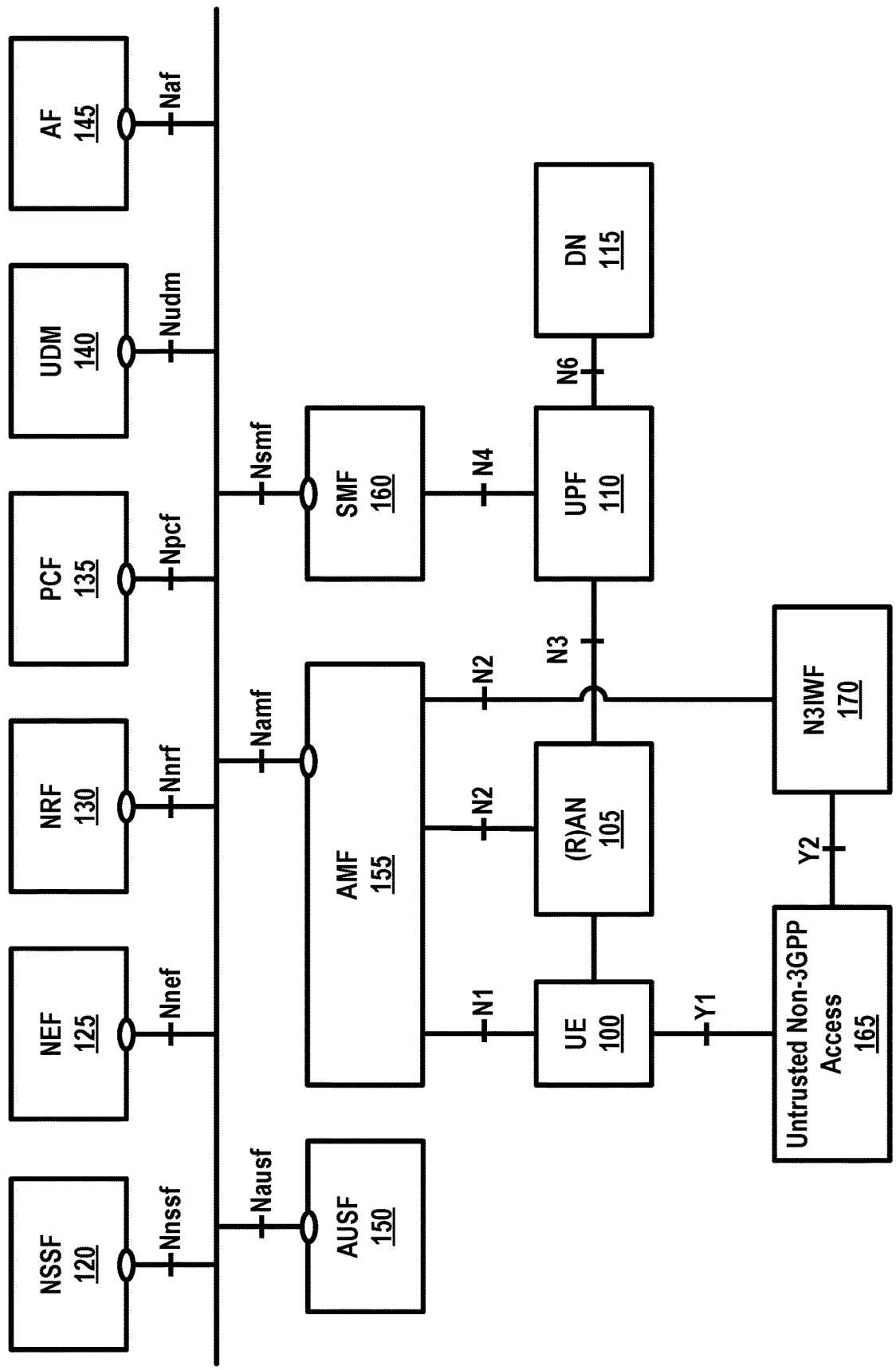
FIG. 1 is a diagram of an example 5G system architecture as per an aspect of an embodiment of the present disclosure.
Figure 2:
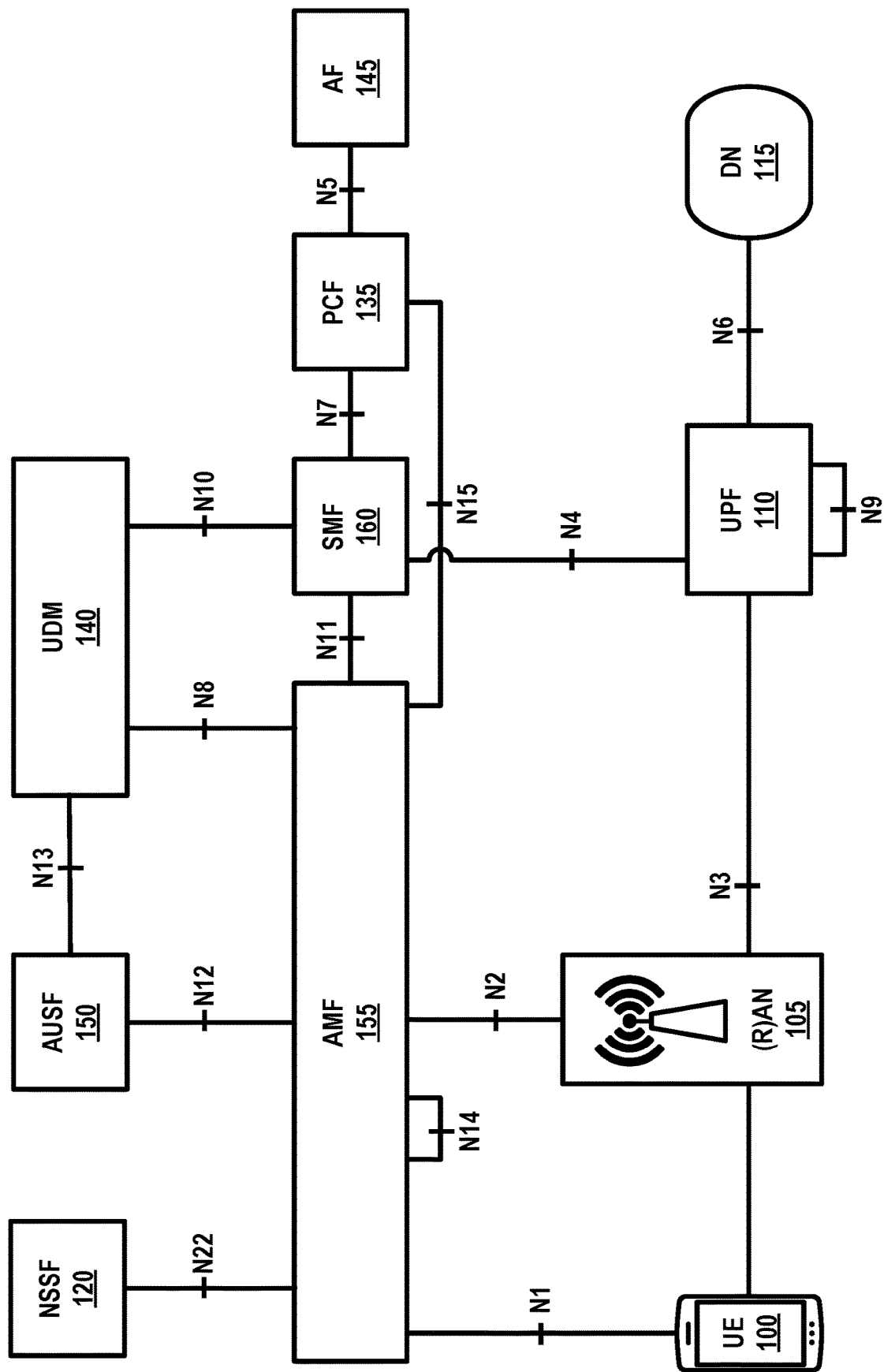
FIG. 2 is a diagram of an example 5G System architecture as per an aspect of an embodiment of the present disclosure.

Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
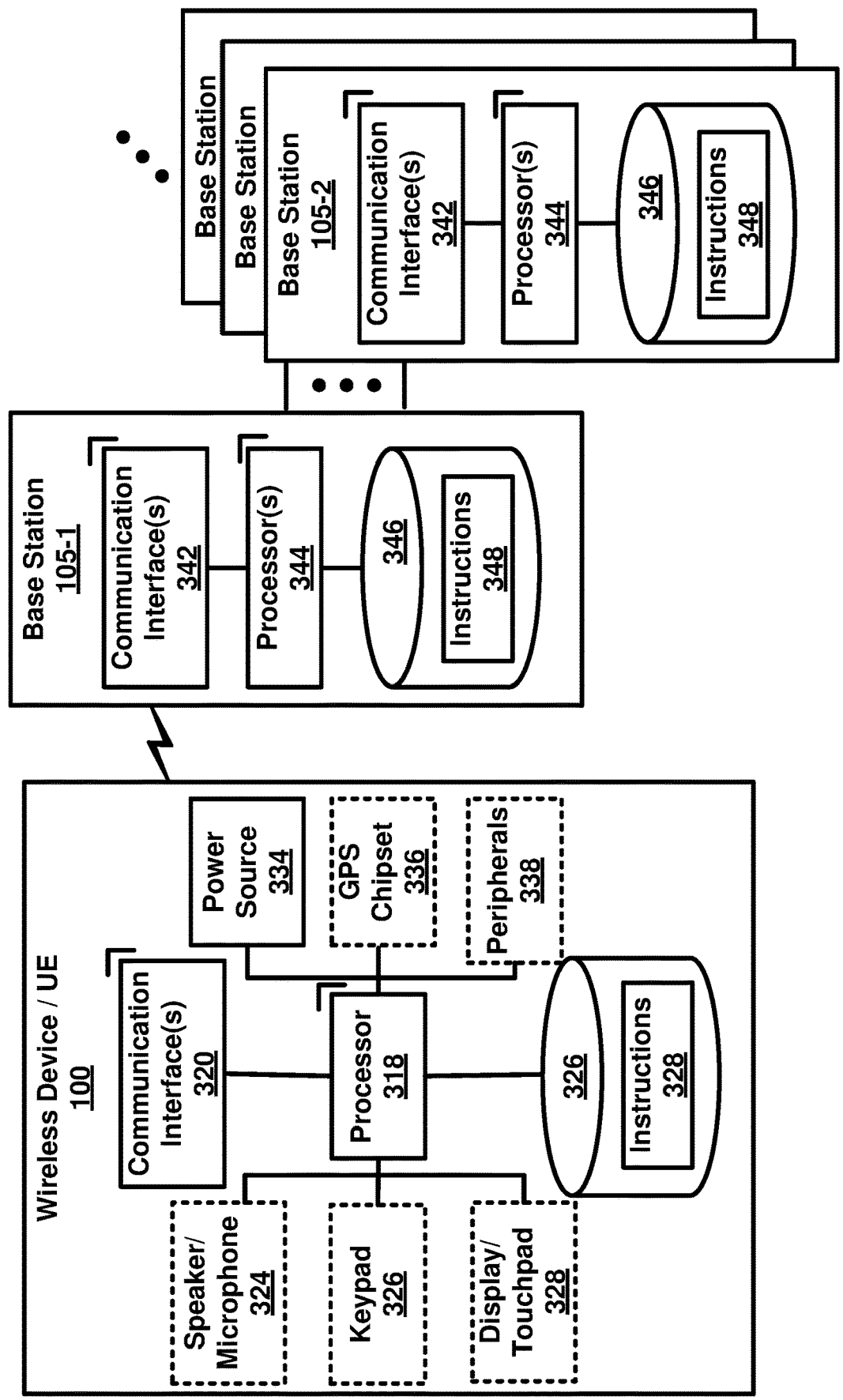
FIG. 3 is a system diagram of an example wireless device and a network node in a 5G system as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
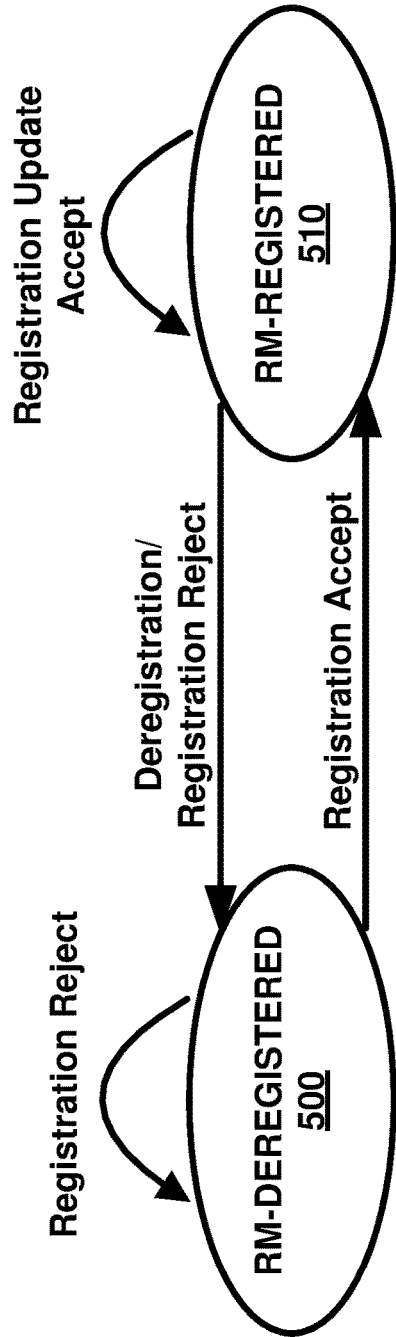
FIG. 5A and FIG. 5B depict two registration management state models in UE 100 and AMF 155 as per an aspect of embodiments of the present disclosure.
Figure 5B:
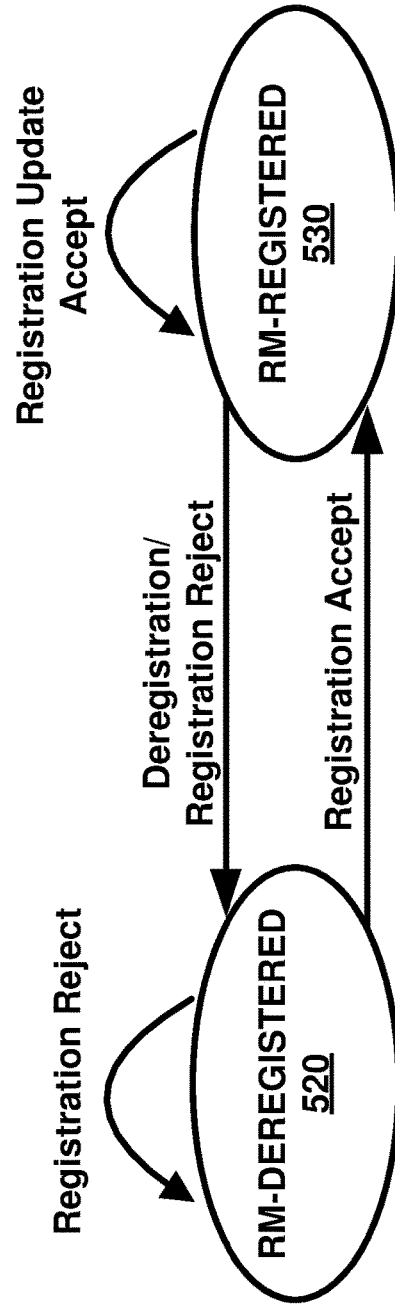

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
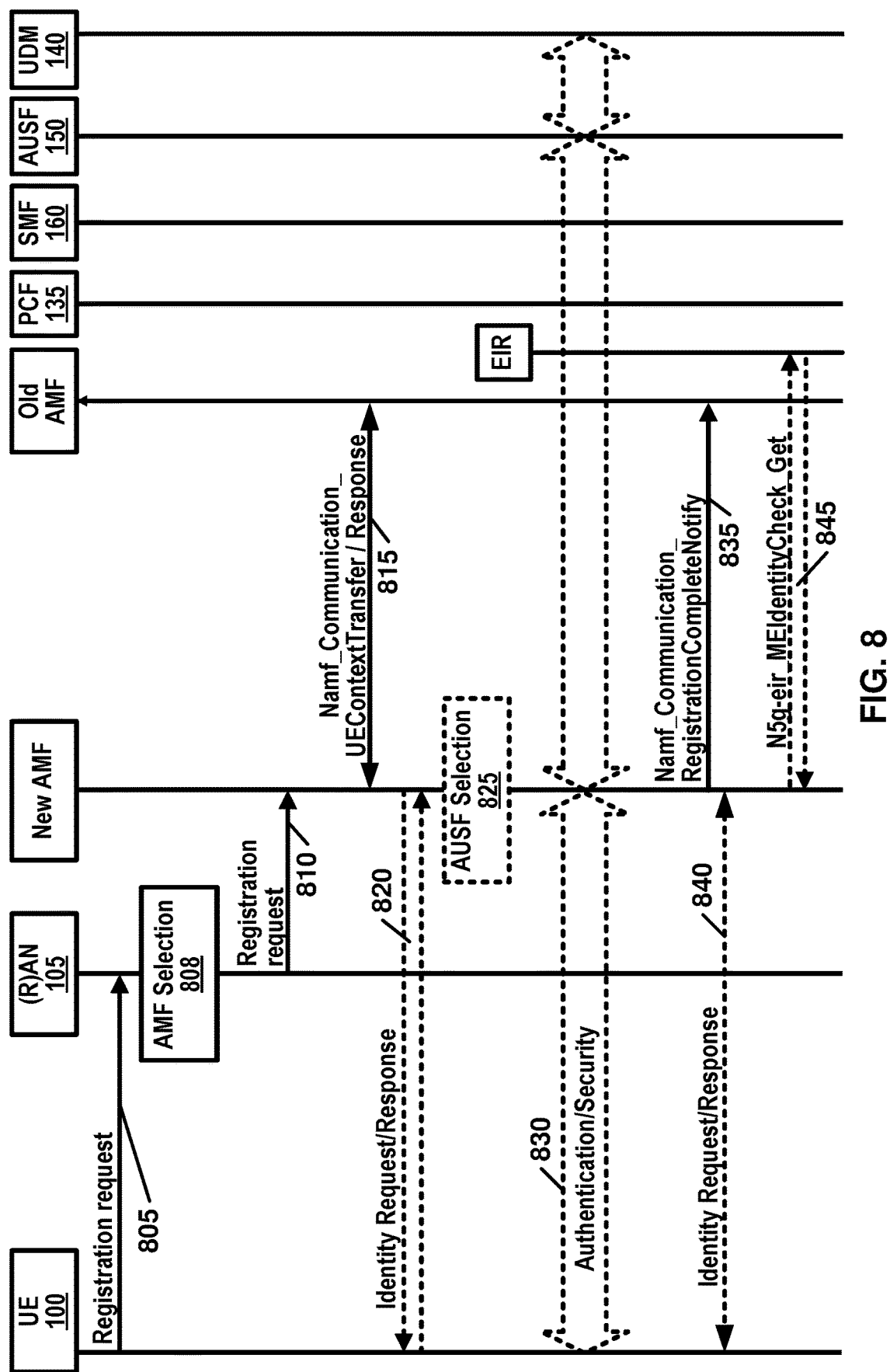
FIG. 8 is an example call flow for registration procedure as per an aspect of an embodiment of the present disclosure.
Figure 9:
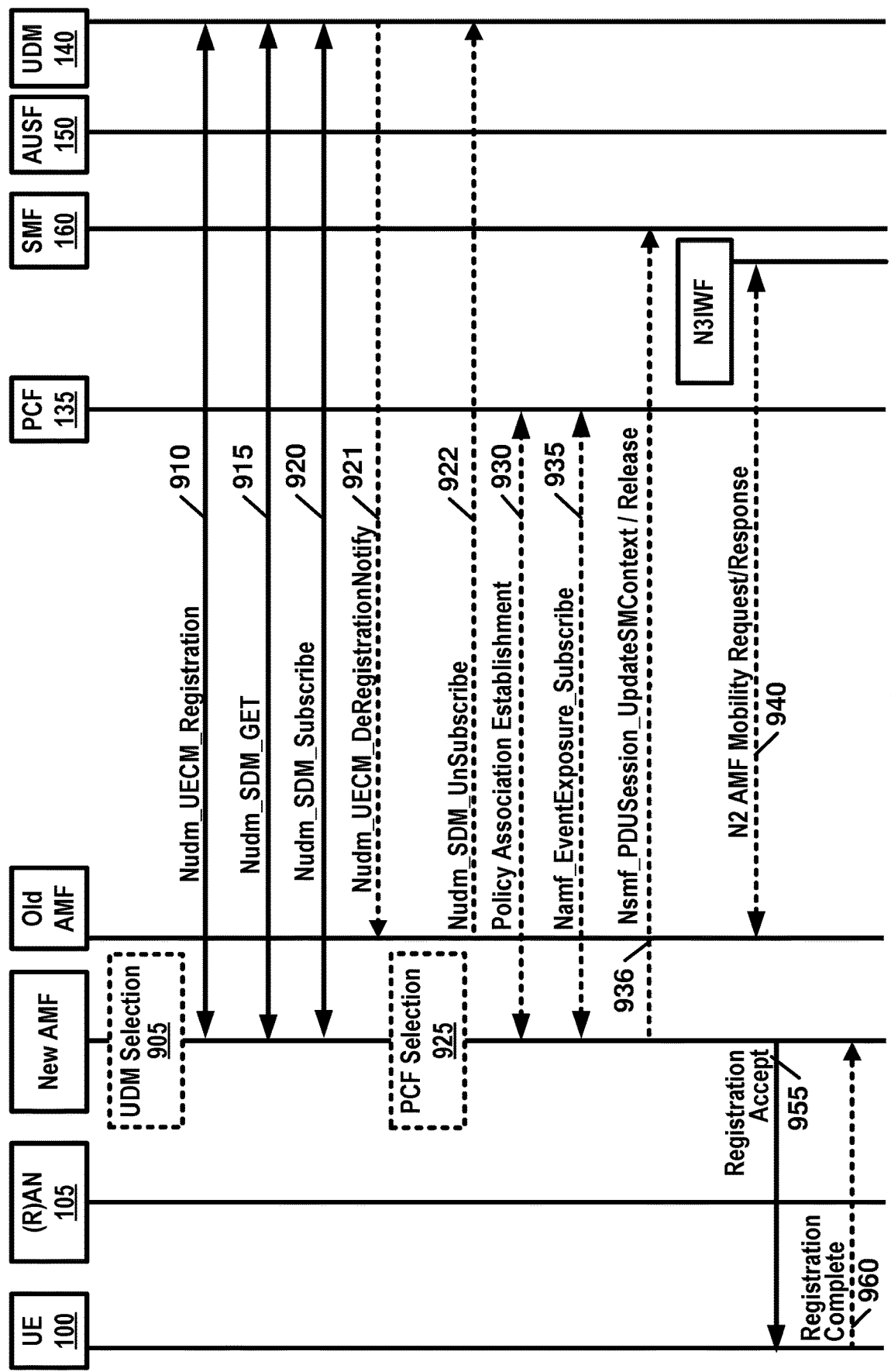
FIG. 9 is an example call flow for registration procedure as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figure 6A:
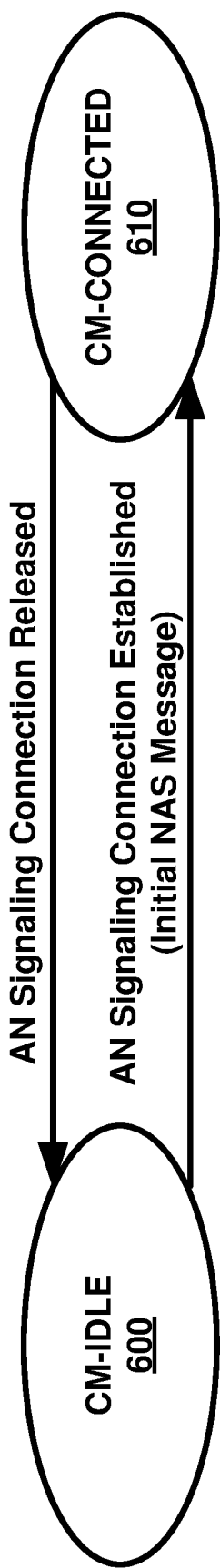
FIG. 6A and FIG. 6B depict two connection management state models in UE 100 and AMF 155 as per an aspect of embodiments of the present disclosure.
Figure 6B:
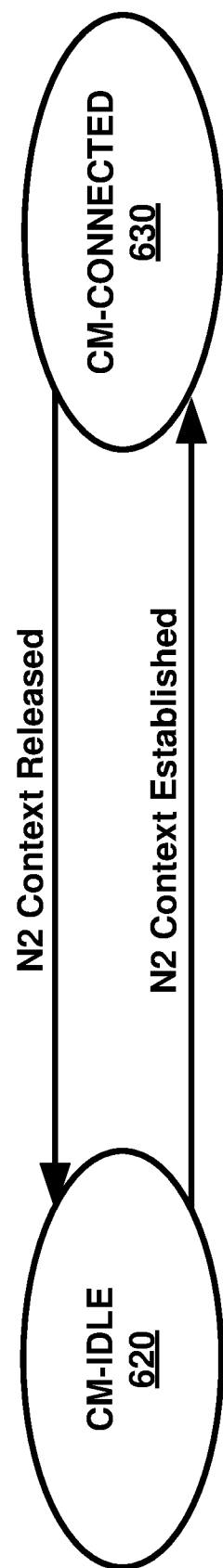

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
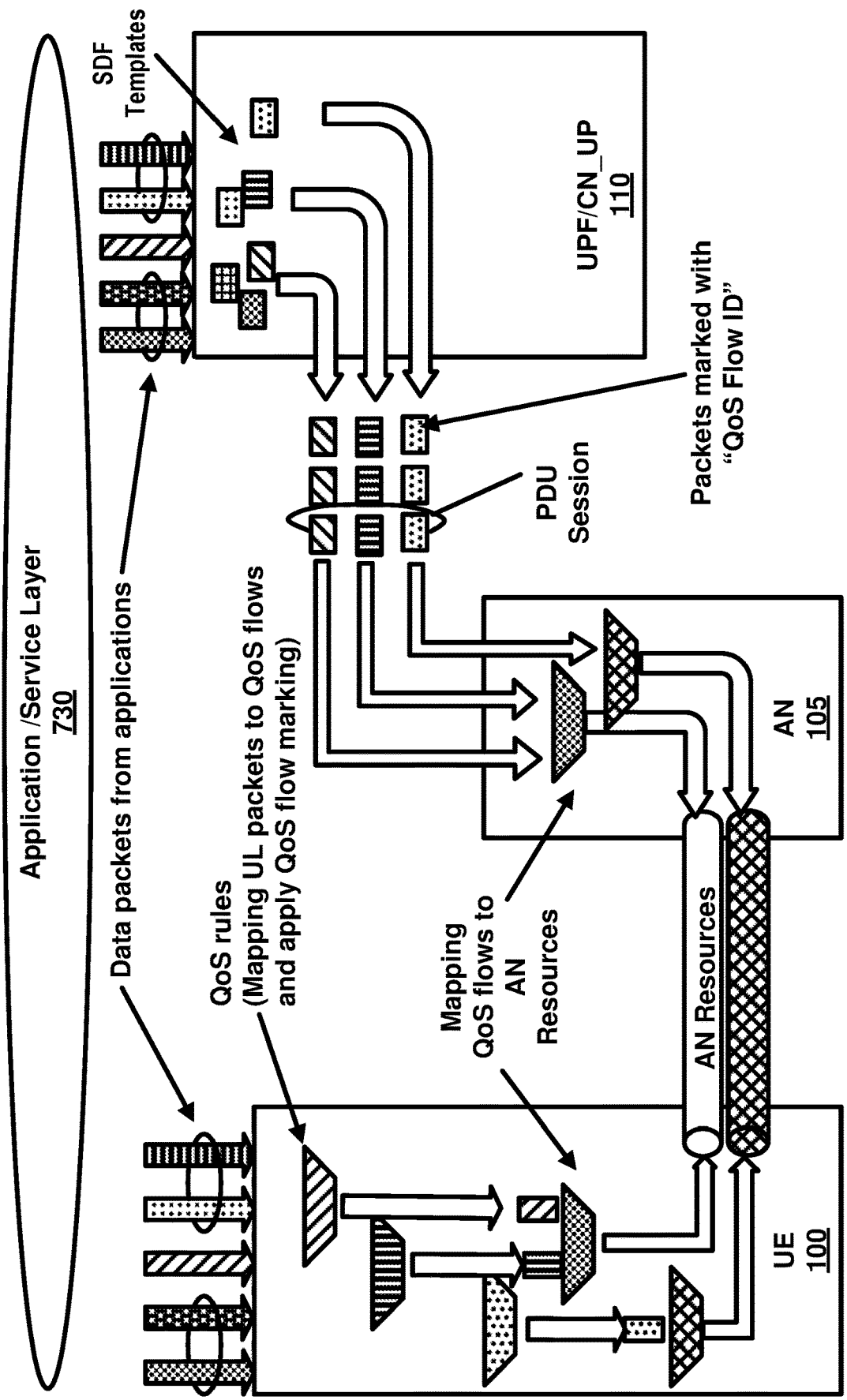
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
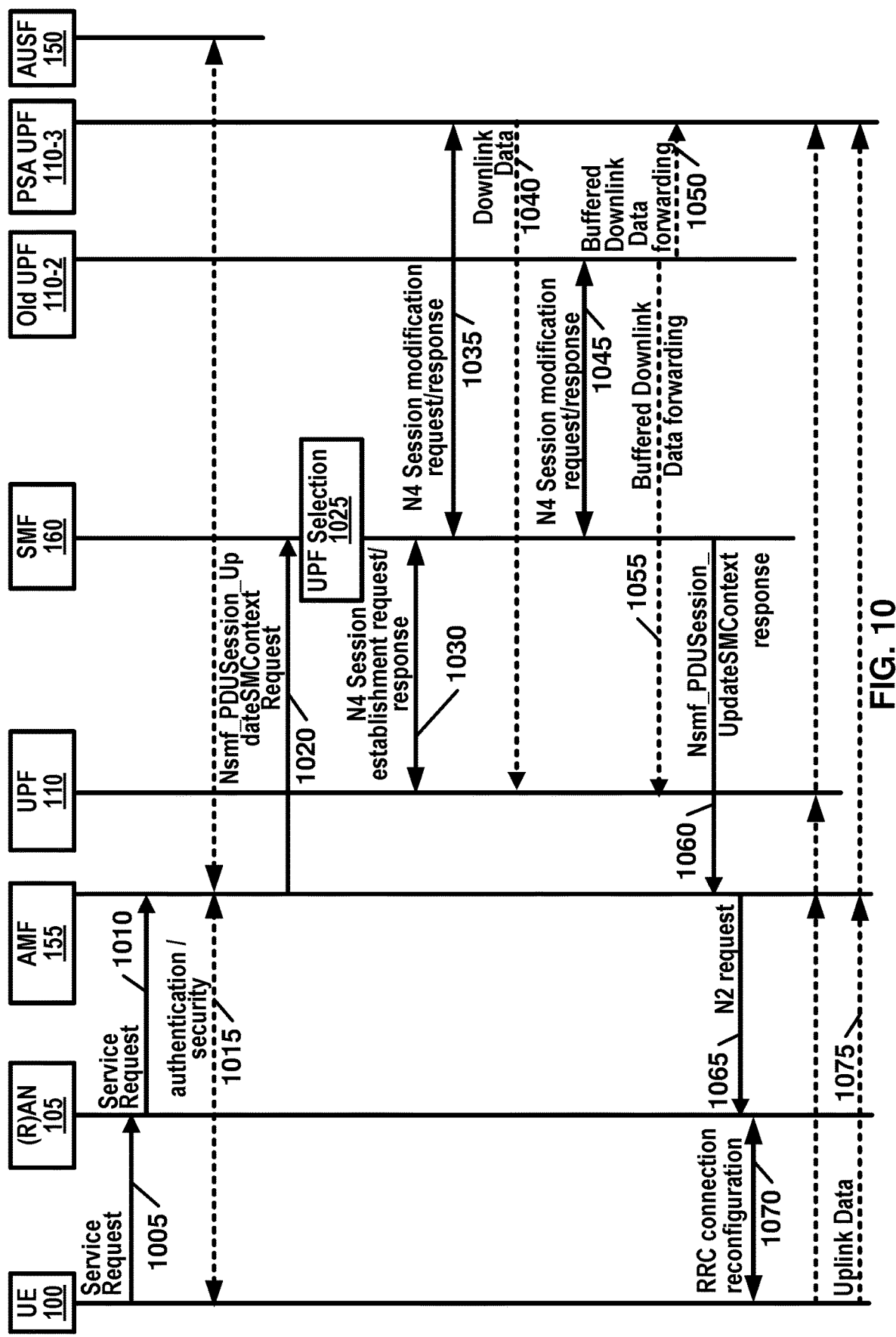
FIG. 10 is an example call flow for service request procedure as per an aspect of an embodiment of the present disclosure.
Figure 11:
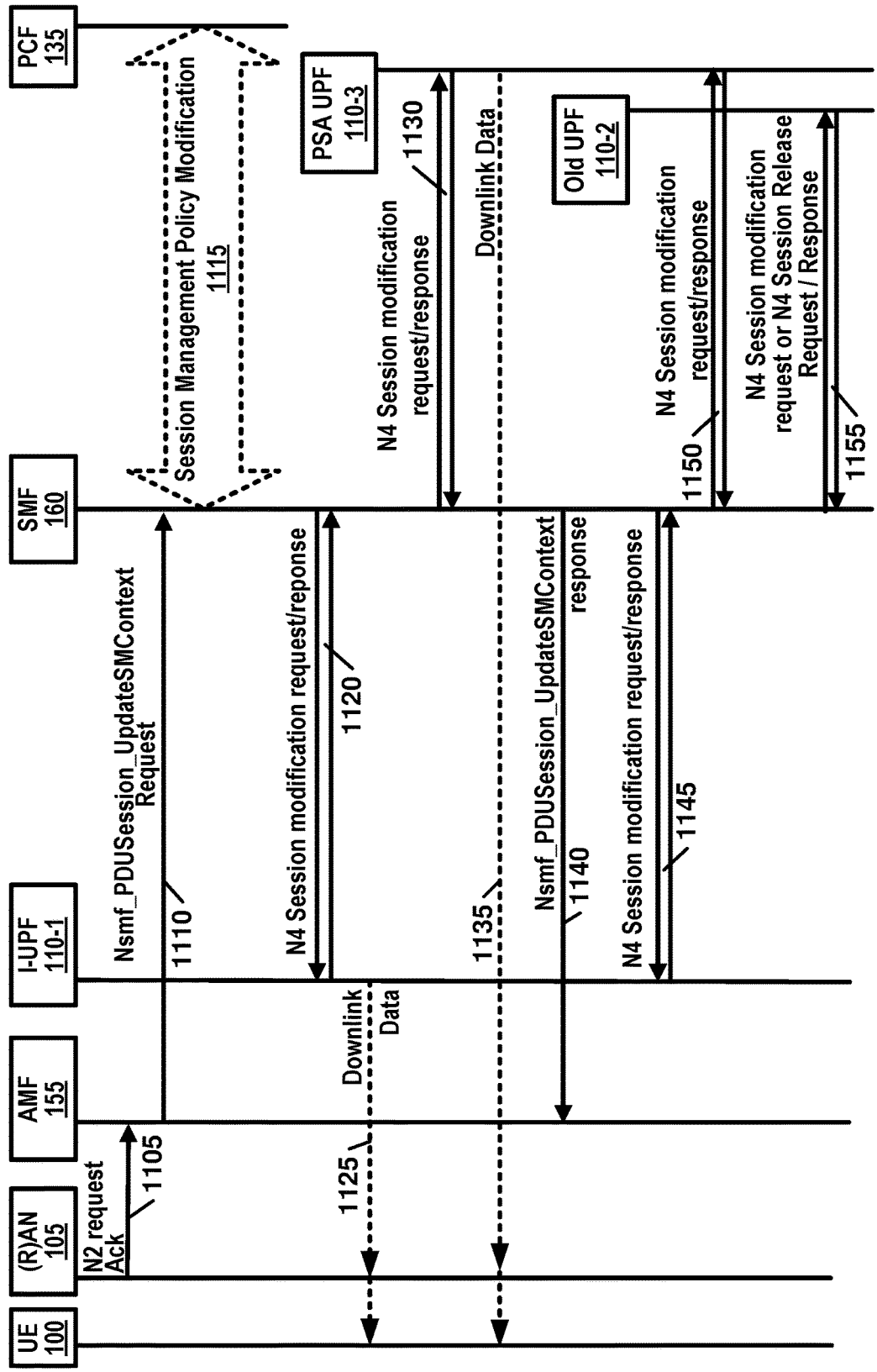
FIG. 11 is an example call flow for service request procedure as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
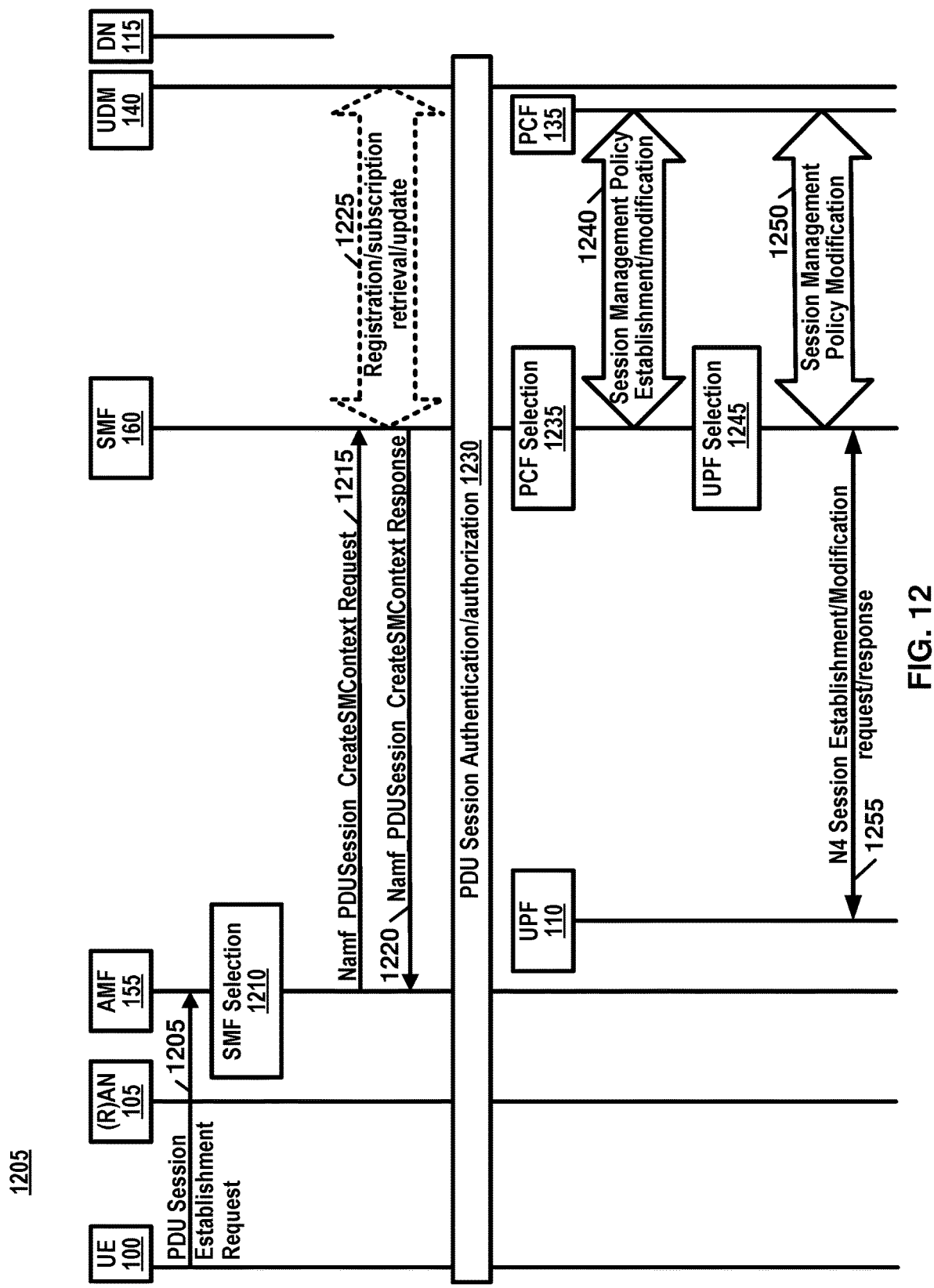
FIG. 12 is an example call flow for PDU session establishment procedure as per an aspect of an embodiment of the present disclosure.
Figure 13:
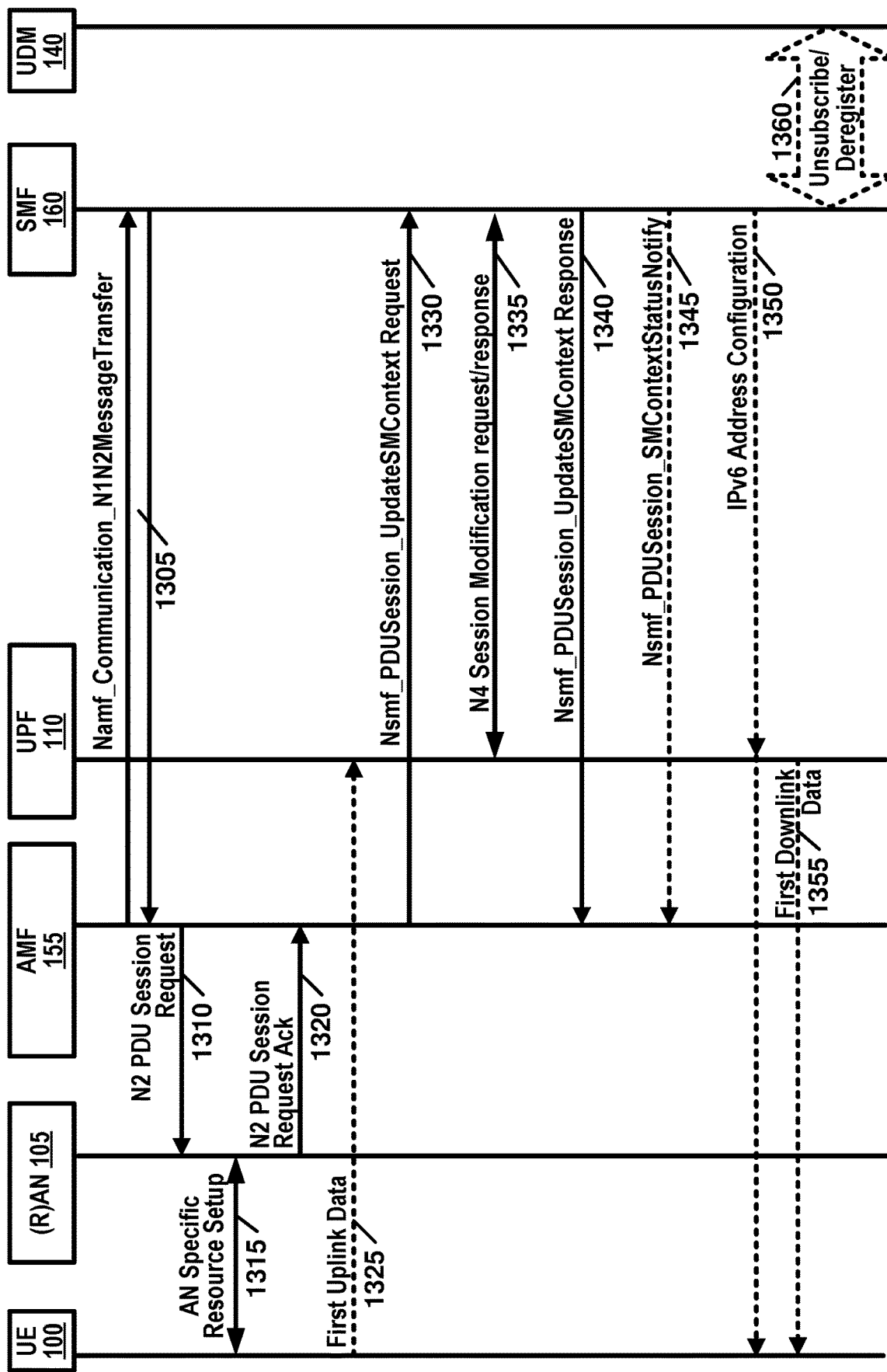
FIG. 13 is an example call flow for PDU session establishment procedure as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g when request type indicates initial request), the AMF 155 may invoke the Nsmf_PDUSession_CreateSMContext request, but if the AMF 155 already has an association with an SMF 160 for the PDU session ID provided by the UE 100 (e.g when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPT. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject (cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_

EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify (release) 1345. The SMF 160 may releases any N4 session(s) created, any PDU session address if allocated (e.g IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
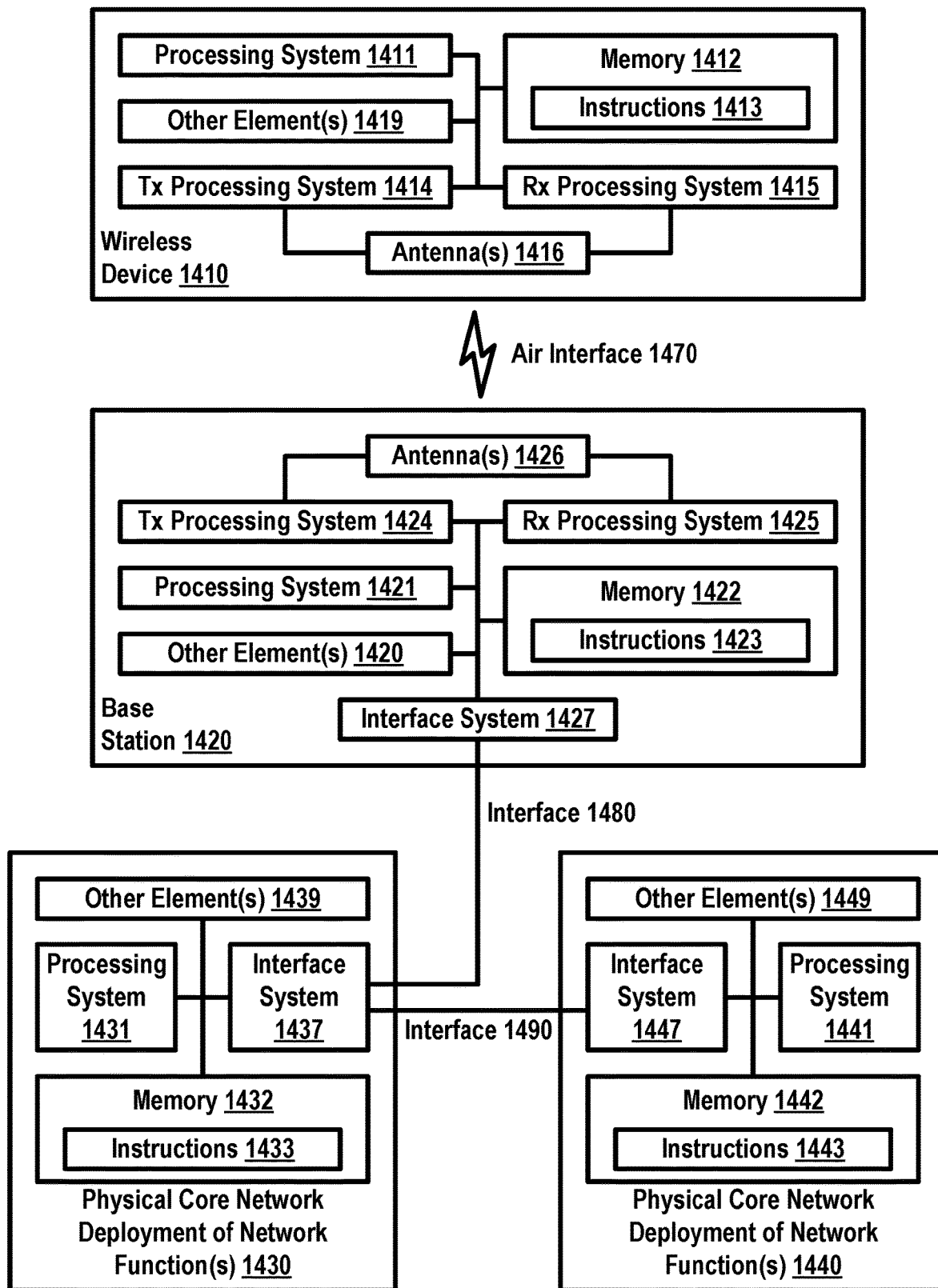
FIG. 14 illustrates an example mobile communication networks as per an aspect of an embodiment of the present disclosure.

FIG. 14 illustrates another example of a mobile communication network in which embodiments of the present disclosure may be implemented. The mobile communication network depicted in FIG. 14 includes a wireless device 1410, a base station 1420, a physical core network deployment of one or more network functions 1430 (henceforth "CN deployment 1430"), and a physical core network deployment of one or more network functions 1440 (henceforth "CN deployment 1440"). The deployment 1430 and the deployment 1440 may be elements of a core network.

The wireless device 1410 may communicate with the base station 1420 over an air interface 1470. The communication direction from the wireless device 1410 to the base station 1420 over the air interface is known as uplink, and the communication direction from the base station 1420 to the wireless device 1410 over the air interface 1470 is known as downlink. Downlink transmissions may be separated from uplink transmissions using FDD, TDD, and/or some combination of the two duplexing techniques. FIG. 14 shows a single wireless device 1410 and a single base station 1420, but it will be understood that the wireless device 1410 may communicate with any number of base stations or other access network components over the air interface 1470, and that the base station 1420 may communicate with any number of wireless devices over the air interface 1470.

The wireless device 1410 may comprise a processing system 1411 and a memory 1412. The memory 1412 may comprise one or more computer-readable media, for example, one or more non-transitory computer readable media. The memory 1412 may include instructions 1413. The processing system 1411 may process and/or execute the instructions 1413. Processing and/or execution of the instructions 1413 may cause the processing system 1411 to perform one or more functions or activities. The memory 1412 may include data (not shown). One of the functions or activities performed by the processing system 1411 may be to store data in the memory 1412 and/or retrieve previously-stored data from the memory 1412. In an example, downlink data received from the base station 1420 may be stored in the memory 1412, and uplink data for transmission to the base station 1420 may be retrieved from the memory 1412. The wireless device 1410 may communicate with the base station 1420 using a transmission processing system 1414 and a reception processing system 1415. The wireless device 1410 may comprise one or more antennas 1416 to access the air interface 1470. Although not shown in FIG. 14, the transmission processing system 1414 and/or the reception processing system 1415 may be coupled to a dedicated memory that is analogous to but separate from the memory 1412, and comprises instructions that may be processed and/or executed to carry out one or more of their respective functionalities.

The wireless device 1410 may comprise one or more other elements 1419. The one or more other elements 1419 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1410 may receive user input data from and/or provide user output data to the one or more one or more other elements 1419. The one or more other elements 1419 may comprise a power source. The wireless device 1410 may receive power from the power source and may be configured to distribute the power to the other components in the wireless device 1410. The power source may comprise one or more sources of power, for example, a battery, a solar cell, a fuel cell, or any combination thereof.

The wireless device 1410 may transmit data to the base station 1420 via the air interface 1470. To perform the transmission, the processing system 1411 may implement layer 3 and layer 2 open systems interconnection (OSI) functionality to process the data for uplink transmission. Layer 3 may include a radio resource control layer (RRC). Layer 14 may include a service data application protocol layer (SDAP), a packet data convergence protocol layer (PDCP), a radio link control layer (RLC), and a media access control layer (MAC). The data may be provided to the transmission processing system 1414, which may implement layer 1 OSI functionality. Layer 1 may include a physical layer (PHY). The wireless device 1410 may transmit the data over the air interface 1470 using one or more antennas 1416. For scenarios where the one or more antennas 1416 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The wireless device 1410 may receive downlink data from the base station 1420 over the air interface 1470. The downlink data may be received via the one or more antennas 1416. The reception processing system 1415 may implement layer 1 OSI functionality on the received downlink data and may provide the data to the processing system 1411. The processing system 1411 may implement layer 2 and layer 3 OSI functionality to process the received downlink data. The base station 1420 may comprise elements analogous to the elements of the wireless device 1410. The base station 1420 may comprise a processing system 1421 and a memory 1422. The memory 1422 may comprise one or more computer-readable media, for example, one or more non-transitory computer readable media. The memory 1422 may include instructions 1423. The processing system 1421 may process and/or execute the instructions 1423. Processing and/or execution of the instructions 1423 may cause the processing system 1421 to perform one or more functions or activities. The memory 1422 may include data (not shown). One of the functions or activities performed by the processing system 1421 may be to store data in the memory 1422 and/or retrieve previously-stored data from the memory 1422. The base station 1420 may communicate with the wireless device 1410 using a transmission processing system 1424 and a reception processing system 1425. The base station 1420 may comprise one or more antennas 1426 to access the air interface 1470. The processing system 1421 may implement layer 14 and layer 3 OSI functionality. The transmission processing system 1424 and the reception processing system 1425 may implement layer 1 OSI functionality to perform transmission of downlink data and reception of uplink data, respectively.

The base station 1420 may comprise an interface system 1427. The interface system 1427 may communicate with one or more elements of the core network via an interface 1480. The interface 1480 may be wired and/or wireless and the interface system 1427 may include one or more components suitable for communicating via the interface 1480. In FIG. 14, the interface 1480 connects the base station 1420 to a single CN deployment 1430, but it will be understood that the wireless device 1410 may communicate with any number of CN deployments over the interface 1480, and that the CN deployment 1430 may communicate with any number of base stations over the interface 1480. The base station 1420 may comprise one or more other elements 1429 analogous to one or more of the one or more other elements 1419.

The CN deployment 1430 may comprise one or more network functions (NFs). For example, the CN deployment 1430 may comprise an AMF and/or a UPF analogous to the AMF and UPF depicted in FIG. 1. The CN deployment 1430 may comprise elements analogous to the elements of the wireless device 1410 and the base station 1420, as described above. The CN deployment 1430 may comprise a processing system 1431 and a memory 1432. The memory 1432 may comprise one or more computer-readable media, for example, one or more non-transitory computer readable media. The memory 1432 may include instructions 1433. The processing system 1431 may process and/or execute the instructions 1433. Processing and/or execution of the instructions 1433 may cause the processing system 1431 to perform one or more functions or activities. The memory 1432 may include data (not shown). One of the functions or activities performed by the processing system 1431 may be to store data in the memory 1432 and/or retrieve previously-stored data from the memory 1432. The CN deployment 1430 may access the interface 1480 using an interface system 1437. The CN deployment 1430 may also use the interface system 1437 to access an interface 1490. The CN deployment 1430 may use the interface 1490 to communicate with one or more data networks (analogous to, for example, the DN(s) depicted in FIG. 1 and/or one or more other CN deployments, including the CN deployment 1440 depicted in FIG. 14. The CN deployment 1430 may comprise one or more other elements 1439.

The CN deployment 1440 may comprise elements analogous to the elements of the CN deployment 1430, as described above. The CN deployment 1440 may comprise a processing system 1441 and a memory 1442. The memory 1442 may comprise one or more computer-readable media, for example, one or more non-transitory computer readable media. The memory 1442 may include instructions 1443. The processing system 1441 may process and/or execute the instructions 1443. Processing and/or execution of the instructions 1443 may cause the processing system 1441 to perform one or more functions or activities. The memory 1442 may include data (not shown). One of the functions or activities performed by the processing system 1441 may be to store data in the memory 1442 and/or retrieve previously-stored data from the memory 1442. The CN deployment 1440 may access the interface 1490 using an interface system 1447. The CN deployment 1440 may comprise one or more other elements.

The processing system 1411, the processing system 1421, the processing system 1431, and/or the processing system 1441 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1411, the processing system 1421, the processing system 1431, and/or the processing system 1441 may perform signal coding/processing, data processing, power control, input/output processing, and/or any other functionality that may enable the wireless device 1410, base station 1420, CN deployment 1430, and/or CN deployment 1440 to operate in a mobile communications system.

Each CN deployment may comprise one or more network functions. Depending on the context in which the term is used, a network function (NF) may refer to a particular set of functionalities and/or one or more physical elements configured to perform those functionalities (e.g., a processing system and memory comprising instructions that, when executed by the processing system, cause the processing system to perform the functionalities). There are many different types of NF and each type of NF may be associated with a different set of functionalities. Different NFs may be flexibly deployed at different locations (for example, in different physical core network deployments) or in a same location (for example, co-located in the same physical core network deployment). Moreover, physical CN deployment are not limited to implementation of NFs. For example, a particular physical CN deployment may further include a base station or portions therefor and/or a data network or portions thereof. Accordingly, one or more NFs implemented on a particular physical core network deployment may be co-located with one or more non-core elements, including elements of an access network or data network.

Figure 15:
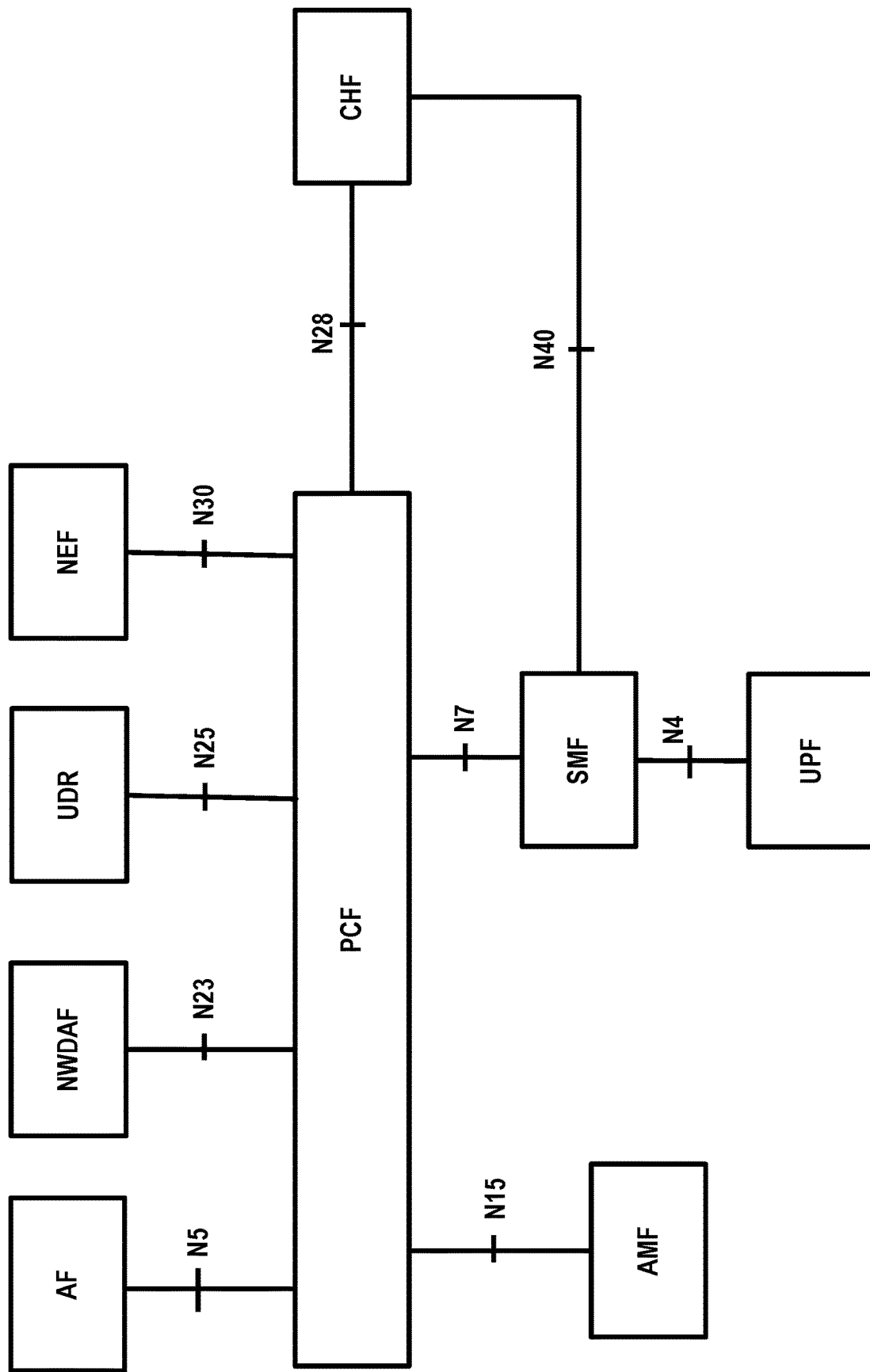
FIG. 15 is a diagram of an example 5G policy and charging control system architecture as per an aspect of an embodiment of the present disclosure.

In an example, FIG. 15 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging. In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered. In an example, online charging may be a process where charging information for network resource usage may be collected concurrently with that resource usage in the same fashion as in offline charging. However, authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required. In an example, converged charging may be a process where online and offline charging may be combined.

Figure 16:
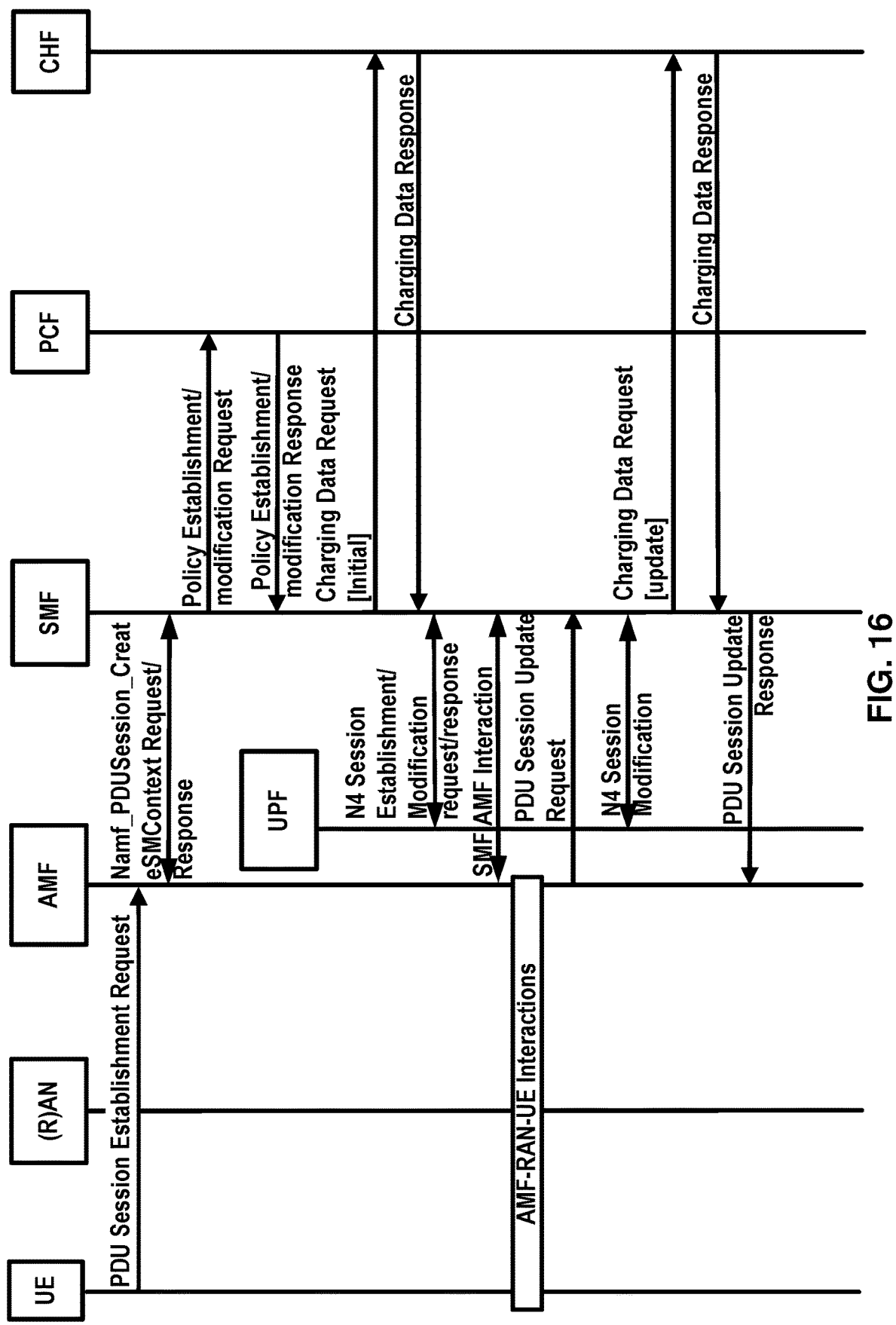
FIG. 16 is an example call flow for PDU session establishment charging as per an aspect of an embodiment of the present disclosure.

FIG. 16 is an example call flow for PDU session establishment charging as per an aspect of an embodiment of the present disclosure. In an example, a UE may initiate a PDU Session establishment procedure. A PDU Session Establishment Request may comprise one or more of: PDU Session ID, PDU Type, SSC mode, User location information and Access Technology Type Information. In response to the message received from the UE, an AMF may select an SMF and send to the selected SMF a message (e.g. Namf_PDUSession_CreateSMContext Request). The SMF may send to the AMF a response message (e.g. Namf_PDUSession_CreateSMContext Response).

In an example, the SMF may select a PCF and send to the PCF a message (e.g. SM Policy Association Establishment Request) to request PCC rules, and the PCF may provide PCC rules in a response message (e.g. SM Policy Association Establishment response). In an example, the SMF may create a Charging Id for the PDU session and may send a Charging Data Request [initial] message to a CHF for authorization for the subscriber to start the PDU session which is triggered by start of PDU session charging event. In an example, the CHF may open CDR for this PDU session and may acknowledge by sending a Charging Data Response [Initial] to the SMF. In an example, the SMF select a UPF and may initiate an N4 Session Establishment/Modification procedure with the selected UPF. The SMF may interact with the AMF, in an example, the SMF may send to the AMF a Namf_Communication_N1N2MessageTransfer message comprising one or more of: PDU Session ID, QoS Profile(s), CN Tunnel Info, and S-NSSAI from the Allowed NSSAI. In an example, the AMF may interact with (R)AN and UE by sending to the (R)AN a N2 PDU Session Request message comprising the information received from the SMF, indicating the PDU session establishment is accepted.

In an example, the (R)AN may send to the AMF a N2 PDU Session Response message comprising one or more of: PDU Session ID, N2 SM information (PDU Session ID, AN Tunnel Info, List of accepted/rejected QFI(s)), wherein the AN Tunnel Info may be corresponding to the Access Network address of the N3 tunnel corresponding to the PDU Session. In an example, the AMF may send to the SMF a Nsmf_PDUSession_UpdateSMContext Request message comprising the N2 SM information received from (R)AN to the SMF. In an example, the SMF may initiate an N4 Session Modification procedure with the UPF. The SMF may provide AN Tunnel Info to the UPF as well as the corresponding forwarding rules. The UPF may send to the SMF a response message. In an example, the SMF may request quota from CHF, e.g. "start of service data flow" event may need quota from CHF. The SMF may send a message to the CHF (e.g. Charging Data Request [update]). As an example, for online charging or converged charging, the SMF may request quota from CHF when allocated quota is consumed or a trigger is met to request a quota.

In an example, the UPF may report resource usage of a PDU session to the SMF. As an example, the UPF may report resource usage of a wireless device to the SMF. by enforcing the charging control rules, the SMF may send to the CHF a message (e.g. Charging Data Request [update]) comprising resource usage information received from the UPF. In an example, the CHF may update CDR for this PDU session. The CHF may acknowledge the SMF by sending a Charging Data Response message. In an example, the SMF may send to the AMF a Nsmf_PDUSession_UpdateSMContext Response message.

Figure 17:
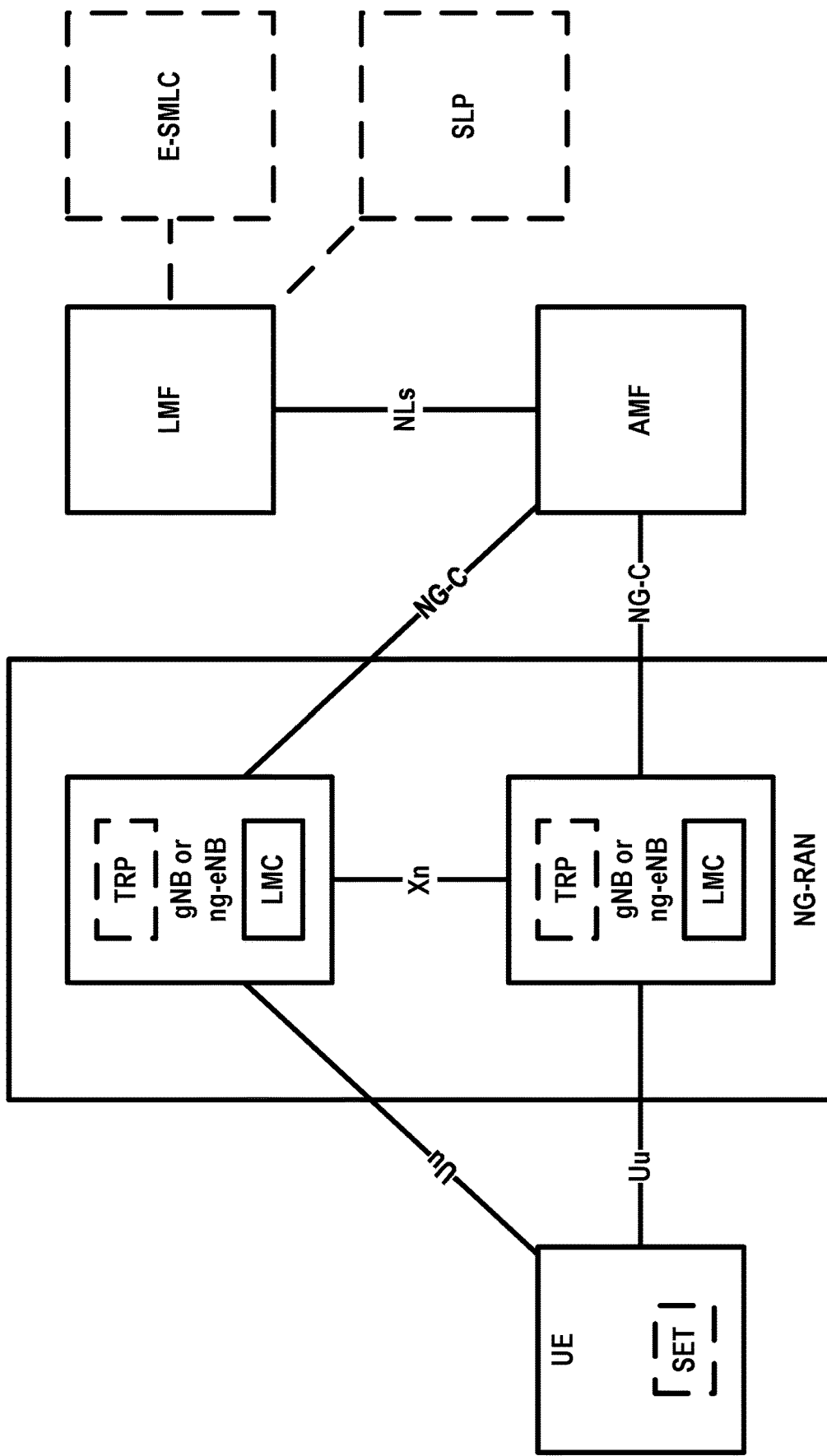
FIG. 17 is a first example arrangement of a local location management component (LMC) associated with a base station as per an aspect of an embodiment of the present disclosure.

FIG. 17 is a diagram of a first example arrangement of a local location management component (LMC) associated with a base station as per an aspect of an embodiment of the present disclosure. In an example architecture, the LMC may be an internal function of the NG-RAN node. In case of split gNB, the LMC may be located in the gNB-CU-CP. The interface between the LMC and the serving NG-RAN node may be internal, and therefore may minimize the latency between the LMC and serving NG-RAN node. Functions of the NLs interface (e.g. an NL1 interface between an AMF and LMF) could be specified also for the NG-C interface. The characteristics of this example architecture may be that no new interface is needed. The characteristics of this example architecture may be that positioning-related signalling is internal to the gNB when UE positioning involves only transmission and reception points (TRPs) within the NG-RAN node. The characteristics of this example architecture may be that to support location continuity in case of handover, LMC relocation to the target NG-RAN node may be enabled via enhancements to the XnAP Handover Preparation procedure.

Figure 18:
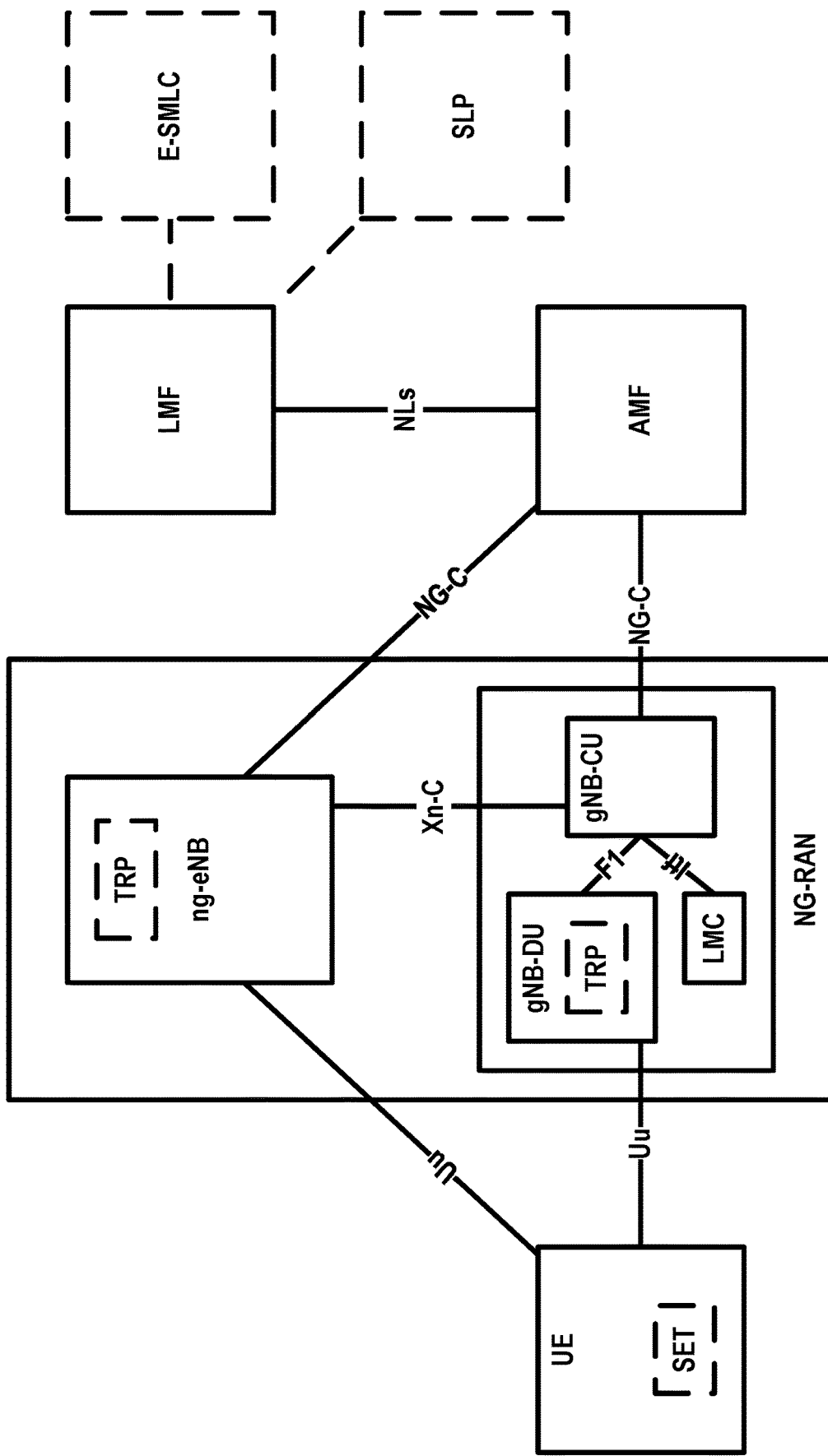
FIG. 18 is a diagram of a second example arrangement of an LMC associated with a base station as per an aspect of an embodiment of the present disclosure.

FIG. 18 is a diagram of a second example arrangement of an LMC associated with a base station as per an aspect of an embodiment of the present disclosure. In an example architecture, the LMC may be a logical node within the split gNB connected to the gNB-CU-CP via a new interface. This example architecture may require a dedicated interface between the LMC and the serving NG-RAN node. The impacts to the NG-C interface may be the same as the example architecture in FIG. 17. The characteristics of this example architecture may be that new interface between the LMC and the gNB-CU-CP is needed. The characteristics of this example architecture may be that LMC and gNB-CU-CP may be provided by different vendors. The characteristics of this example architecture may be that offloading of positioning support from a gNB-CU is allowed.

Figure 19:
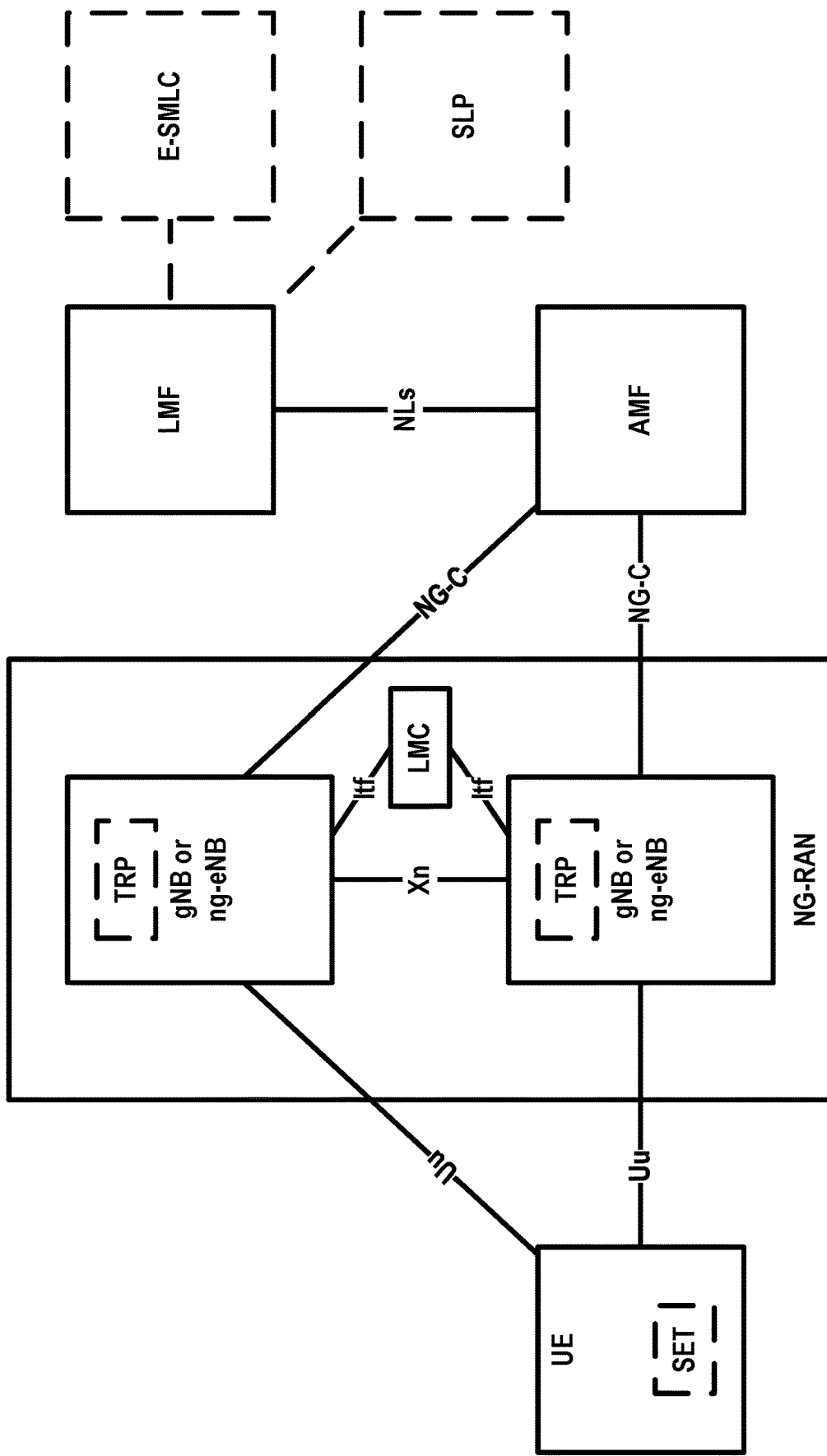
FIG. 19 is a third example arrangement of an LMC associated with a base station as per an aspect of an embodiment of the present disclosure.

FIG. 19 is a diagram of a third example arrangement of an LMC associated with a base station as per an aspect of an embodiment of the present disclosure. In an example architecture, the LMC may be a new logical node outside or inside a NG-RAN, connected to NG-RAN nodes (gNBs and/or ng-eNBs) via a new interface. This example architecture may require a dedicated interface between the LMC and the serving NG-RAN node. The impacts to the NG-C interface may be the same as the example architecture in FIG. 17 and may be supported by the new interface. The characteristics of this example architecture may be that new interface between the LMC and the NG-RAN node is needed. The characteristics of this example architecture may be that LMC and NG-RAN nodes may be provided by different vendors. The characteristics of this example architecture may be that a single LMC may support multiple NG-RAN nodes (i.e. avoid introducing LMC in each individual NG-RAN node). The characteristics of this example architecture may be that offloading of positioning support from a gNB-CU is allowed. The characteristics of this example architecture may be that to support location continuity in case of handover when both source and target NG-RAN nodes are served by the same LMC, LMC relocation may not be needed.

Figure 20:
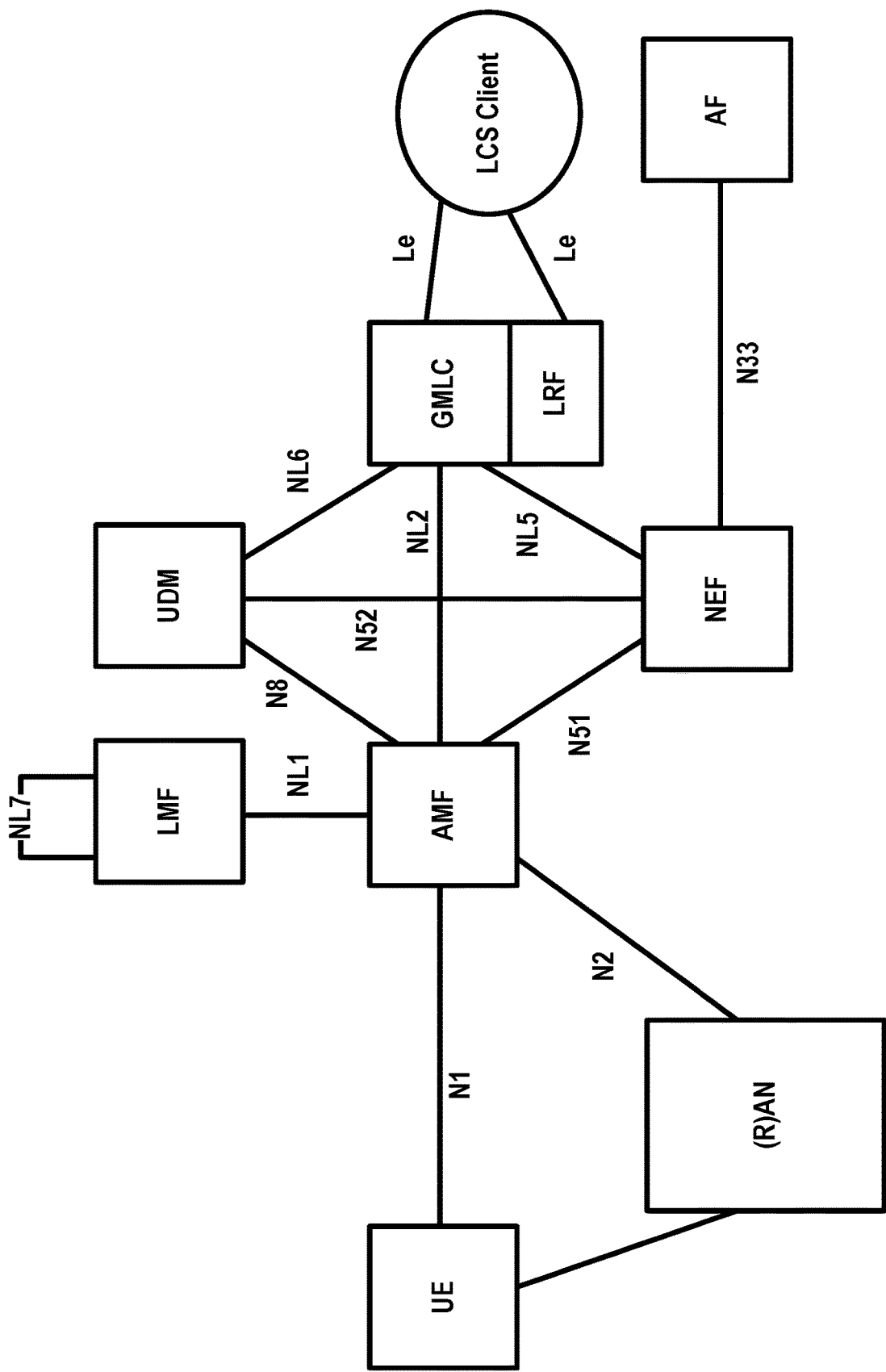
FIG. 20 is a diagram of an example architecture for location service as per an aspect of an embodiment of the present disclosure.

FIG. 20 is a diagram of an example architecture for location service as per an aspect of an embodiment of the present disclosure. In an example, an access network may be involved in the handling of various positioning procedures including positioning of a target UE, provision of location related information not associated with a particular target UE and transfer of positioning messages between an AMF or LMF and a target UE. In an example, AFs and NFs may access LCS services from a GMLC in the same trust domain (e.g. in the same PLMN) using the Ngmlc interface or Event Exposure with location information from an AMF in the same trust domain using the Namf interface. LCS clients may access LCS services from a GMLC (e.g. HGMLC) using the Le reference point. External AFs may access LCS services from a NEF using Nnef interface. A Gateway Mobile Location Centre (GMLC) may contain functionality required to support LCS. In one PLMN, there may be more than one GMLC. A GMLC is the first node an external LCS client accesses in a PLMN (i.e. the Le reference point is supported by the GMLC). AFs and NFs may access GMLC directly or via NEF. The GMLC may request routing information and/or target UE privacy information from a UDM via the Nudm interface. After performing authorization of an external LCS Client or AF and verifying target UE privacy, a GMLC may forward a location request to either a serving AMF using Namf interface or to a GMLC in another PLMN using the Ngmlc interface in the case of a roaming UE. A location retrieval function (LRF) may be collocated with a GMLC or separate. The LRF is responsible for retrieving or validating location information, providing routing and/or correlation information for a UE which has initiated an IMS emergency session. The information may be provided by an LRF to an E-CSCF.

In an example, a UE may support positioning with four different modes. A UE may support positioning with UE assisted mode, where the UE may perform location measurements and send the measurements to another entity (e.g. an LMF) to compute a location. A UE may support positioning with UE based mode, where the UE may perform location measurements and computes a location estimate making use of assistance data provided by serving PLMN. A UE may support positioning with standalone mode, where the UE may perform location measurements and compute a location estimate without making use of assistance data provided by serving PLMN. A UE may support positioning with network based mode, where a serving PLMN may perform location measurements of signals transmitted by a target UE and compute a location estimate.

In an example, the transmission of UE signals for network based mode may or may not be transparent to the UE. A limited set of UE positioning capability information may be transferred to the 5GCN during registration of the UE. Some of this positioning capability information may be transferred subsequently to an LMF. UE positioning capability information may also be transferred directly to a location server (e.g. LMF). A UE may support additional functions to support location services. For example, a UE may support location requests received from a network for 5GC-MT-LR, 5GC-NI-LR or a deferred 5GC-MT-LR for periodic or triggered location. For example, a UE may support location requests to a network for a 5GC-MO-LR. For example, a UE may support privacy notification and verification for a 5GC-MT-LR or deferred 5GC-MT-LR for periodic or triggered location. For example, a UE may support sending updated privacy requirements to a serving AMF (for transfer to a UDR via UDM). For example, a UE may support periodic or triggered location reporting to an LMF. For example, a UE may support change of a serving LMF for periodic or triggered location reporting. For example, a UE may support cancelation of periodic or triggered location reporting. For example, a UE may support multiple simultaneous location sessions. For example, a UE may support reception of unciphered and/or ciphered assistance data broadcast by NG-RAN. For example, a UE may support reception of ciphering keys for the assistance data from the AMF.

In an example, an AMF may contain functionality responsible for managing positioning for a target UE for all types of location request. The AMF may be accessible to the GMLC and NEF via the Namf interface, to the RAN via the N2 reference point and to the UE via the N1 reference point. The AMF may perform one or more functions to support location services. For example, the AMF may initiate an NI-LR location request for a UE with an IMS emergency call. For example, the AMF may receive and manage location requests from a GMLC for a 5GC-MT-LR and deferred 5GC-MT-LR for periodic, triggered and UE available location events. For example, the AMF may receive and manage location requests from a UE for a 5GC-MO-LR. For example, the AMF may receive and manage event exposure request for location information from an NEF. For example, the AMF may select an LMF, optionally taking into account UE access type(s), serving AN node, network slicing, QoS, LCS Client type, RAN configuration information, LMF capabilities, LMF load. LMF location, indication of either a single event report or multiple event reports, duration of event reporting. For example, the AMF may receive updated privacy requirements from a UE and transfer to a UDR via UDM. For example, the AMF may support cancelation of periodic or triggered location reporting for a target UE. For example, the AMF may support change of a serving LMF for periodic or triggered location reporting for a target UE. For example, when assistance data is broadcast by 5GS in ciphered form, the AMF may receive ciphering keys from the LMF and forwards to suitably subscribed UEs using mobility management procedures.

In an example, an LMF may manage the overall coordination and scheduling of resources required for the location of a UE that is registered with or accessing 5GCN. It may calculate or verify a final location and any velocity estimate and may estimate the achieved accuracy. The LMF may receive location requests for a target UE from the serving AMF using the Nlmf interface. The LMF may interact with the UE in order to exchange location information applicable to UE assisted and UE based position methods. The LMF may interact with the NG-RAN, N3IWF or TNAN in order to obtain location information. The LMF may determine the result of the positioning in geographical co-ordinates. If requested and if available, the positioning result may comprise the velocity of the UE. The LMF may perform additional functions to support location services. For example, the LMF may support a request for a single location received from a serving AMF for a target UE. For example, the LMF may support a request for periodic or triggered location received from a serving AMF for a target UE. For example, the LMF may determine position methods based on UE and PLMN capabilities, QoS and LCS Client type. For example, the LMF may report UE location estimates directly to a GMLC for periodic or triggered location of a target UE. For example, the LMF may support cancelation of periodic or triggered location for a target UE. For example, the LMF may support the provision of broadcast assistance data to UEs via NG-RAN in ciphered or unciphered form and forward any ciphering keys to subscribed UEs via the AMF.

In an example, LMF selection functionality may be used by the AMF to determine an LMF for location estimation of the target UE. If an LMF ID is available in the UE location context or provided by the UE, the AMF may first evaluate if the LMF identified by the LMF ID can be used. The LMF selection functionality may be supported by the LMF if it determines that it is unsuitable or unable to support location for the current UE access network or serving cell for the deferred 5GC-MT-LR procedure for periodic, or triggered location events. LMF reselection may be a functionality supported by AMF when necessary, e.g. due to UE mobility. The AMF may select a new LMF if the AMF determines that LMF identified by the LMF ID may not be used. The AMF may select a new LMF if the LMF ID is not available in the UE location context. The AMF may select a new LMF if the LMF ID is not provided by the UE. The LMF selection may be performed at the AMF or LMF based on the locally available information i.e. LMF profiles are configured locally at AMF or LMF, or by querying NRF. LMF selection may performed when a location request is received at the AMF and the AMF determines to use the LMF for UE position estimation. LMF selection may performed when the subscribed UE event reporting is received. In an example, requested quality of service information may be considered for LMF selection, e.g. LCS accuracy, response time (e.g. latency), and/or Access Type (e.g. 3GPP/N3GPP). For example, location methods may differ depending on the Access Type, e.g. in case of WLAN Access Location determination may just correspond to retrieval of IP addressing information from the N3IWF/TNGF; as another example, for Wireline access, Location determination may just correspond to retrieval of geo coordinates corresponding to a Line Id. In an example, RAT type (i.e. 5G NR or eLTE) and/or the serving AN node (i.e. gNB or NG-eNB) of the target UE may be considered for LMF selection. In an example, RAN configuration information may be considered for LMF selection. In an example, LMF capabilities may be considered for LMF selection. In an example, LMF load may be considered for LMF selection. In an example, LMF location may be considered for LMF selection. In an example, indication of either a single event report or multiple event reports may be considered for LMF selection. In an example, duration of event reporting may be considered for LMF selection. In an example, network slicing information, e.g. S-NSSAI and/or NSI ID may be considered for LMF selection.

In an example, LCS Quality of Service may be used to characterize the location request. It may either be determined by the operator or determined based on the negotiation with the LCS client or the AF. It may be optional for LCS client or the AF to provide the LCS Quality of Service in the location request. LCS Quality of Service information may be characterized by 3 key attributes: LCS QoS class, accuracy, and/or response time. The LCS QoS class may define the degree of adherence by the Location Service to another quality of service parameter (e.g. accuracy), if requested. The 5G system may attempt to satisfy the other quality of service parameter regardless of the use of QoS class. There may be 2 LCS QoS classes, Best Effort class and/or Assured class. For example, a Best Effort class may define the least stringent requirement on the QoS achieved for a location request. If a location estimate obtained does not fulfil the other QoS requirements, it may still be returned but with an appropriate indication that the requested QoS was not met. If no location estimate is obtained, an appropriate error cause may be sent. For example, Assured class may define the most stringent requirement on the accuracy achieved for a location request. If a location estimate obtained does not fulfil the other QoS requirements, then it may be discarded, and an appropriate error cause may be sent.

In existing technologies, a wireless device may lose positioning capabilities during handover. For example, the wireless device may be connected to a first base station. The first base station may be associated with a first LMC, and the first LMC may support a positioning capability of the wireless device. The wireless device, while it is connected to the first base station, may use the positioning capability of the first LMC to operate in accordance with an application and/or service that depends on the positioning capability. However, if the wireless device hands over to a second base station in accordance with existing technologies, and the second base station is not associated with the first LMC (e.g., associated with a second LMC different from the first LMC), then the availability of the positioning capability may be jeopardized. For example, if the second LMC does not support the positioning capability of the wireless device, then the positioning capability of the wireless device may be lost upon handover. As a result, handover of the wireless device, which may be necessary for mobility purposes, may prevent the wireless device from reliably operating in accordance with applications and/or services that depend on the positioning capability.

Example embodiments of the present disclosure may provide an enhanced mechanism to support positioning capability control for at least one LMC during handover procedure. Example embodiments of the present disclosure may provide enhanced mechanisms to enable a second AMF (e.g. target AMF) to select a second LMC (e.g. a target LMC) to serve a second base station (e.g. a target base station) based on a positioning capability of the second LMC. Example embodiments of the present disclosure may provide enhanced mechanisms to enable a second base station (e.g. a target base station) to select a second LMC (e.g. a target LMC) based on a positioning capability of the second LMC. By incorporating positioning capability of LMC into handover determinations, the network can reduce the impact of wireless device mobility on the reliability of positioning-reliant applications and/or services. Example embodiments of the present disclosure may provide enhanced mechanisms to enable an AMF to select a new LMC or a new LMF if the at least one second base station may not be able to select an associated LMC.

For example, in existing technologies, a wireless device may handover from a source base station (associated with a source AMF) to a target base station (associated with a target AMF). Handover may be completed in accordance with existing techniques. However, the target base station may have different positioning capabilities than the source base station. If the target base station does not meet the requirements of the wireless device, then the handover may cause a loss of services.

In an example, a first base station (e.g., a source base station) may determine to hand over a wireless device. The first base station may send to a first AMF a message indicating that handover of the wireless device is required. The first base station may indicate a positioning type of the wireless device. The first AMF may send the positioning type to a second AMF. The second AMF may select an LMC based on the positioning type of the wireless device. The second AMF may send an identifier of the LMC to a second base station (e.g., a target base station). In this manner, the network may facilitate a handover to the second base station that does not interrupt, delay, or cause a loss of positioning services to the wireless device.

In an example, a first base station (e.g., a source base station) may determine to hand over a wireless device. The first base station may send to a first AMF a message indicating that handover of the wireless device is required. The first base station may indicate a positioning type of the wireless device. The first AMF may send the positioning type to a second AMF. The second AMF may send the positioning type to a second base station (e.g., a target base station). The second base station may select an LMC based on the positioning type of the wireless device. In this manner, the network may facilitate a handover to the second base station that does not interrupt, delay, or cause a loss of positioning services to the wireless device.

In an example, a first base station (e.g., a source base station) may determine to hand over a wireless device. The first base station may send to a second base station (e.g., a target base station) a message indicating a positioning type of the wireless device. The second AMF may select an LMC based on the positioning type of the wireless device. In this manner, the network may facilitate a handover to the second base station that does not interrupt, delay, or cause a loss of positioning services to the wireless device.

Figure 21:
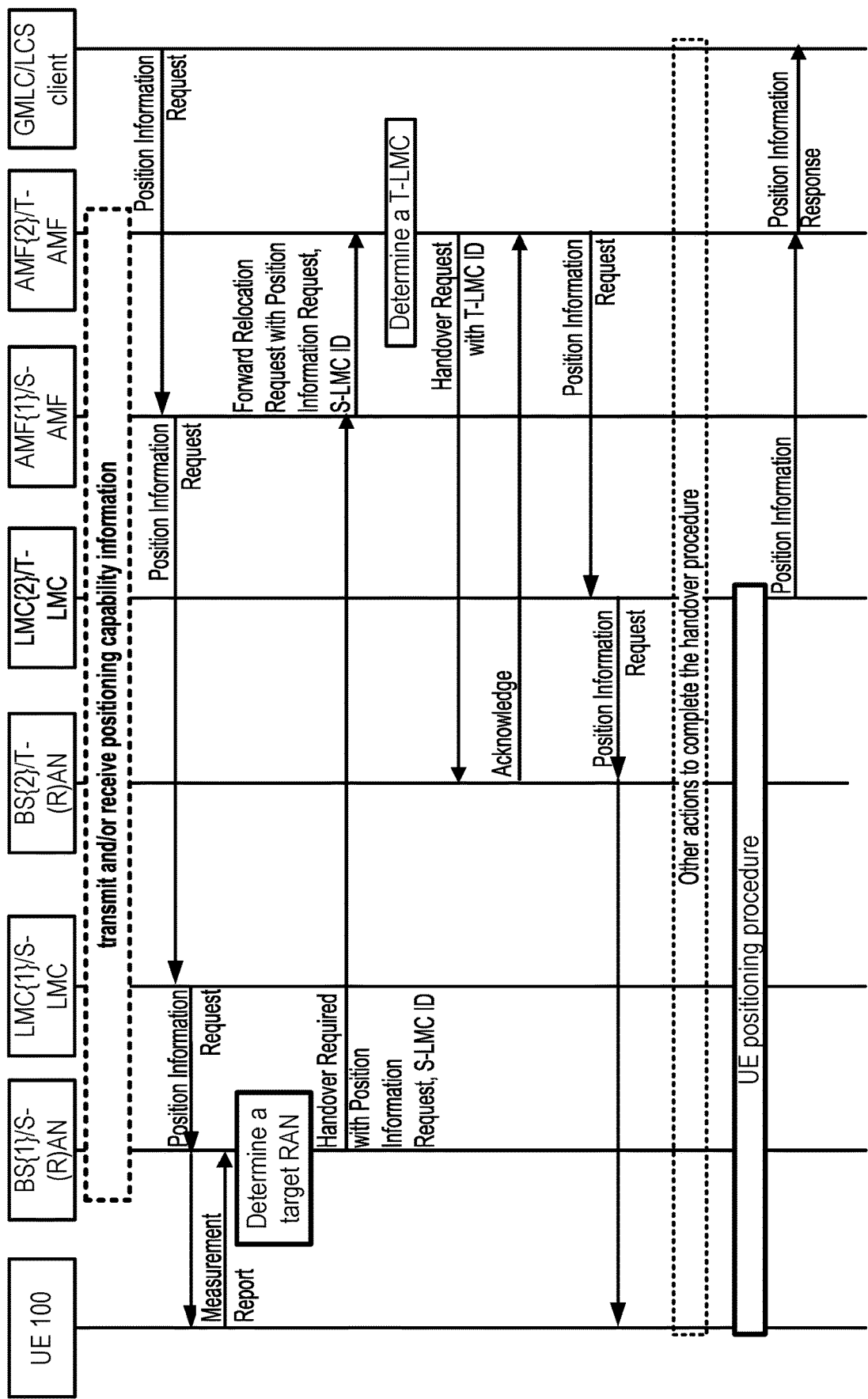
FIG. 21 is an example call flow as per an aspect of an embodiment of the present disclosure.

FIG. 21 shows an example call flow which may comprise one or more actions. In an example, a second AMF (e.g., a target AMF, illustrated in the figure as AMF{2}/T-AMF) may obtain positioning capability information of at least one second location management component (LMC) (e.g., at least one target LMC, illustrated in the figure as LMC{2}/T-LMC) and/or information that a second base station (e.g. a target base station) is associated with the at least one second LMC. The at least one target LMC may be, for example, LMCs in an AMF serving area and/or a tracking area. The second base station may be, for example, base station in an AMF serving area and/or a tracking area.

In an example, the second AMF may obtain the positioning capability information of at least one second LMC and/or information that a second base station is associated with the at least one second LMC by local configuration. In an example, the second AMF may obtain the positioning capability information of at least one second LMC and/or information that a second base station is associated with the at least one second LMC by receiving it from the at least one second LMC, e.g., the at least one second LMC may send to the second AMF the positioning capability information of at least one second LMC and/or information that the second base station is associated with the at least one second LMC. In an example, the second AMF may obtain the positioning capability information of at least one second LMC and/or information that a second base station is associated with the at least one second LMC by receiving it from the second base station, e.g., the second base station may send to the second AMF the positioning capability information of at least one second LMC and/or information that the second base station is associated with the at least one second LMC.

In an example, the second AMF may obtain the positioning capability information of at least one second LMC and/or information that a second base station is associated with the at least one second LMC by receiving them (it) from another network entity (e.g. OAM, NRF, and/or the like). In an example, the OAM and/or NRF may have positioning capability information of at least one second LMC and/or information that a second base station is associated with the at least one second LMC (e.g. LMCs in an AMF serving area and/or a tracking area, LMCs in an OAM/NRF serving area) by local configuration. In an example, the NRF may receive positioning capability information of at least one second LMC and/or information that a second base station is associated with the at least one second LMC from another network function (e.g. OAM). For example, the OAM/NRF may receive positioning capability information of at least one second LMC and/or information that a second base station is associated with the at least one second LMC from the at least one second LMC. For example, the OAM/NRF may receive positioning capability information of at least one second LMC and/or information that a second base station is associated with the at least one second LMC from the second base station. For example, the OAM/NRF may send positioning capability information of at least one second LMC and/or information that a second base station is associated with the at least one second LMC to the AMF(s) (e.g. the second AMF) to other network entity (e.g. the second AMF) in the AMF/OAM/NRF serving area.

The positioning capability information of the at least one second LMC may indicate whether the at least one second LMC supports UE positioning. The positioning capability information may indicate a type of UE positioning that is supported by the LMC. As an example, the positioning capability information may comprise at least one of: a parameter indicating support of an LMC connected/associated to a base station (e.g. as shown in FIG. 19); a parameter indicating support of Enhanced Cell Identity (ECID) capability; a parameter indicating support of Observed Time Difference of Arrival (OTDOA) capability; a parameter indicating support of network-assisted GNSS methods; a parameter indicating support of WLAN positioning; a parameter indicating support of Bluetooth positioning; a parameter indicating support of Terrestrial Beacon System (TBS) positioning; a parameter indicating support of barometric pressure sensor (BPS) positioning; a parameter indicating no support of a positioning capability; and an identifier of an LMC (LMC ID).

FIG. 22 shows an example definition of a parameter/information element for the positioning capability information. Any of the positioning capability information described in the current application may have the format shown in FIG. 22.

Returning to FIG. 21, in an example, a gateway mobile location center (GMLC) may receive a request message for location services (LCS). The request message may be received from an LCS client. The request message may request a location of a particular UE (e.g., the UE illustrated in the figure). The LCS service request message may comprise a position information request (message). The position information request may have one or more information elements/parameters. For example, the positioning information request may comprise one or more positioning information request parameters indicating one or more of the following: at least one positioning type; a priority of the at least one positioning type; a UE identity of the UE for which position information is requested (e.g. GPSI and/or SUPI), a required QoS, Supported GAD shapes, an LCS client type. The positioning type may indicate a type of positioning. The positioning type may comprise at least one of: a parameter indicating positioning of Enhanced Cell Identity (ECID); a parameter indicating positioning of Observed Time Difference of Arrival (OTDOA); a parameter indicating WLAN positioning; a parameter indicating Bluetooth positioning; a parameter indicating Terrestrial Beacon System (TBS) positioning; a parameter indicating barometric pressure sensor positioning; and/or a parameter indicating an accuracy of positioning (e.g. 10 centimeters). The priority of the at least one positioning type may indicate one or more prioritized positioning types, one or more non-prioritized positioning types, and/or a priority of each of one or more respective positioning types. For example, an application in the LCS client may prefer a positioning type of ECID and may accept the positioning type of OTDOA and/or WLAN position. The LCS client may send to the GMLC a LCS service request message, the LCS service request message may comprise a first parameter indicating a positioning type of ECID; a second parameter indicating a priority value 1 for the positioning type of ECID; a third parameter indicating a positioning type of OTDOA; a fourth parameter indicating a priority value 2 for the positioning type of OTDOA; a fifth parameter indicating a WLAN positioning; and/or a sixth parameter indicting a priority value 3 for the WLAN positioning, wherein the priority value 1 may be the highest priority and the priority value 3 may be the lowest priority compare to the highest priority. The required QoS may comprise at least one of: accuracy of the positioning, response time for the positioning request, LCS QoS class. The LCS client type may comprise at least one of: emergency services, value added services, PLMN operator services, and/or lawful intercept services.

In response to the message received from the LCS client, the GMLC may send a message (e.g. Nudm_UECM_Get) to a home UDM of the UE (not shown). The message may comprise one or more of the position information request parameters (e.g. parameters in the position information request message) described above, for example, the UE identity (e.g. GPSI and/or SUPI). The home UDM may send serving AMF information (e.g. AMF identity and/or AMF address) of the UE to the GMLC. In an example, the serving AMF may be a first AMF or a source AMF, illustrated in the figure as AMF{1}/S-AMF. In response to the message received from the LCS client and/or the message received from the UDM, the GMLC may send to the (serving) AMF{1} a message (illustrated as positioning information request). The position information request may comprise one or more of the position information request parameters described above, for example, one or more of the parameters included in the LCS service request. The position information request may be a Namf_Location_ProvidePositioningInfo service operation to request the current location of the UE.

In response to the message received from the GMLC, based on UE registration information and/or UE subscription information, the AMF{1} may determine that the first LMC (e.g. illustrated in the figure as LMC{1}/S-LMC) and/or the first base station (e.g. illustrated in the figure as BS{1}/S-(R)AN) are (is) serving for the UE. The AMF{1} may send a message to the LMC{1} requesting the UE position. The message may be a position information request. The position information request may comprise one or more of the position information request parameters described above, for example, one or more of the parameters received from the GMLC. For example, the AMF{1} may send a Nlmf_Location_DetermineLocation (service operation) message to the LMC{1}. For example, the AMF{1} may use NGAP protocol for the message sent to the LMC{1}. For example, the AMF{1} may send a DOWNLINK UE ASSOCIATED NRPPA TRANSPORT message to the LMC{1}. For example, the AMF{1} may send a NGAP DL Transfer message to the LMC{1}, and the NGAP DL Transfer message may comprise a Nlmf_Location_DetermineLocation (service operation) message. The position information request (message) may have one or more elements/parameters. For example, the positioning information request may comprise one or more positioning information request parameters indicating one or more of the following: at least one positioning type; a priority of the at least one positioning type; a UE identity of the UE for which position information is requested (e.g. GPSI and/or SUPI), a required QoS, Supported GAD shapes, an LCS client type, a priority of a LCS client (e.g. "HIGHEST_PRIORITY", "NORMAL_PRIORITY"), a correlation ID, an identity of the AMF (e.g. an identifier and/or an address of the AMF), ECGI, NCGI, and/or velocity Requested (e.g. "VELOCITY_IS_REQUESTED", "VELOCITY_IS_NOT_REQUESTED"). The correlation ID may be used to identify a positioning transaction (e.g. a NGAP DL Transfer and an associated NGAP UL Transfer) and/or a positioning message (e.g. NGAP DL Transfer and/or Nlmf_Location_DetermineLocation (service operation)).

In response to the message received from the AMF{1}, the LMC{1} may take one or more actions. In an example action, based on the message received from the AMF{1} and/or the positioning capability information of the UE, the LMC{1} may determine a positioning type for the UE to measure the UE position/location. For example, based on the at least one positioning type, the priority of the at least one positioning type, and/or the positioning capability information of the UE, the LMC{1} may determine a positioning type for the UE. For example, the at least one positioning type may indicate a ECID and/or the priority of the at least one positioning type may indicate that ECID has a higher priority than other positioning types, and the positioning capability information of the UE may indicate that the UE supports ECID and/or OTDOA, based on above information, the LMC{1} may determine ECID as the positioning type for the UE to measure the UE position/location. The positioning capability information of the UE may indicate positioning type/method supported by the UE. For example, positioning capability information of the UE may comprise at least one of: a parameter indicating UE supporting Enhanced Cell Identity (ECID); a parameter indicating UE supporting Observed Time Difference of Arrival (OTDOA); a parameter indicating UE supporting network-assisted GNSS methods; a parameter indicating UE supporting WLAN positioning; a parameter indicating UE supporting Bluetooth positioning; a parameter indicating UE supporting Terrestrial Beacon System (TBS) positioning; a parameter indicating UE supporting barometric pressure sensor positioning, and/or a parameter indicating no support of a positioning capability. For example, the LMC{1} may have the positioning capability information of the UE by local configuration. For example, the LMC{1} may receive the positioning capability information of the UE from a network entity (e.g. OAM). For example, the LMC{1} may receive the positioning capability information of the UE from the UE.

In an example action, the LMC{1} may send to the UE a message via the BS{1}. The message may request the UE position. The message may be a position information request. The position information request (message) may comprise one or more of the position information request parameters described above, for example, one or more of the parameters received from the AMF{1}. For example, LTE positioning protocol (LPP) may be used for the positioning signalling between LMC{1} and the UE, and the LPP may be transported in an RRC message container. For example, the LMC{1} may send a DLInformationTransfer message to the UE via the BS{1}, and the DLInformationTransfer message may comprise the position information request or one or more parameters thereof, as described previously. In an example, the DLInformationTransfer message and/or the position information request sent by LMC{1} to the UE may comprise a RequestLocationInformation message body.

FIG. 23 is an example diagram of the RequestLocationInformation message body described above. As illustrated in FIG. 23, the RequestLocationInformation message body may comprise one or more information elements.

Returning to FIG. 21, in response to the message received from the LMC{1}, the UE may perform (or attempt to perform) a UE positioning procedure. As will be discussed in greater detail below, if handover is determined, the UE positioning procedure may not be started/completed. To perform the UE positioning procedure, the UE may determine a positioning type (e.g., a method of determining UE position) based on the message received from LMC{1}. For example, based on the at least one positioning type and/or the priority of the at least one positioning type and/or UE positioning capability, the UE may determine a positioning type/method for UE positioning. For example, the message received by the UE from the LMC{1} may indicate that a positioning type of ECID has a higher priority (e.g. priority value 1) than other positioning type and the UE may support the positioning type of ECID, the UE may determine to perform positioning measurement by using ECID positioning method/technology. For example, the message received by the UE from the LMC{1} may indicate that a supported positioning type of OTDOA has a higher priority (e.g. priority value 1) than a supported positioning type of WLAN (e.g. priority value 2), and the UE may not support the positioning type of OTDOA, the UE may determine to perform positioning measurement by using WLAN positioning method/technology.

During the UE positioning procedure (e.g. before the UE has started/finished the UE positioning procedure), the UE may move to a new area (e.g. new cell, new tracking area). The UE may send measurement report to BS{1}. The measurement report may comprise a radio signal measurement of one or more cells and/or base stations. In response to the message received from the UE, BS{1} may take one or more actions. In an example action, based on the measurement report, BS{1} may determine a handover for the UE.

In an example, a base station (e.g. BS{1}) may have the configuration information that a list of base stations (e.g. BS{1}, BS{2}, etc.) is served by the same LMC (e.g. LMC{1}). In an example, a base station may receive from a network function (e.g. LMC, AMF, OAM, NRF, and/or the like) the configuration information that a list of base stations is served by the same LMC (e.g. LMC{1}).

In an example action, based on the measurement report of one or more cells and/or base stations, and/or based on the configuration information that a list of base stations is served by the same LMC, the BS{1} (e.g. source base station) may determine a target base station for the handover. For example, the BS{1} may determine a target base station that both the BS{1} and the target base station are served by the same LMC. For example, the measurement report may indicate that the radio signal of BS{3} is better than the radio signal of BS{2} (e.g. illustrated in the figure as BS{2}/T-(R)AN); and/or the configuration information may indicate that BS{1} and BS{3} are served by the same LMC, based on above information, BS{1} may determine/select the BS{3} as the target base station. For example, the measurement report may indicate that the radio signal of BS{3} is better than the radio signal of BS{2}; and/or the configuration information may indicate that BS{1} and BS{2} are served by the same LMC, based on above information, BS{1} may determine/select the BS{2} as the target base station. For example, the measurement report may indicate that the radio signal of BS{2} is better than the radio signal of other base stations; and/or the configuration information may indicate that BS{1} is served by the LMC{1}, and other base stations are not served by the LMC{1}, based on above information, BS{1} may determine/select the BS{2} as the target base station.

In an example, there may not be an direct interface (e.g. Xn) between the source base station (e.g. BS{1}) and the target base station (e.g. BS{2}), the BS{1} may decide to initiate an N2-based handover to the BS{2}. The BS{1} may send a message (e.g. handover required) to the source AMF (e.g. AMF{1}) for the handover. In an example, the handover required message may comprise the position information request or parameters/elements thereof. In an example, the handover required message may comprise the LMC{1} identifier. In an example, the handover required message may comprise the positioning capability of the UE. In an example, the BS{1} may have the positioning capability of the UE by local configuration. In an example, the BS{1} may receive the positioning capability of the UE from the UE. In an example, the BS{1} may receive the positioning capability of the UE from a network entity (e.g. LMC, AMF, OAM, NRF and/or the like).

In an example, the handover required message may comprise a transparent RRC container with necessary information to prepare the handover at the target side. For example, the handover required message may comprise at least one of: the identity of BS{2} and/or a target cell ID, KgNB*, C-RNTI of the UE in BS{1}, RRM-configuration comprising UE inactive time, basic AS-configuration comprising antenna Info and DL Carrier Frequency, current QoS flow to DRB mapping rules applied to the UE, SIB1 from BS{1}, UE capabilities for different RATs, PDU session related information, and/or UE reported measurement information comprising beam-related information if available. The PDU session related information may comprise the slice information and/or QoS flow level QoS profile(s).

In response to the message received from BS{1}, the AMF{1} may determine/select an AMF (e.g. a target AMF/AMF{2}) based on the information received from the BS{1} (e.g. the identity of BS{2} and/or the target cell ID). In an example, the AMF{1} may send to the AMF{2} a handover message (e.g. Namf_Communication_CreateUE-Context Request, Forward Relocation Request). In an example, the handover message sent to the AMF{2} may comprise one or more information elements of the handover required message. For example, the Namf_Communication- _CreateUEContext Request message may comprise the position information request or parameters/elements thereof (e.g. the at least one positioning type). For example, the Namf_Communication_CreateUEContext Request message may comprise the LMC{1} identifier. For example, the Namf_Communication_CreateUEContext Request message may comprise the GMLC identifier. For example, the Namf_Communication_CreateUEContext Request message may comprise the positioning capability of the UE.

In response to the message received from the AMF{1}, the AMF{2} may take one or more actions. In an example action, based on the information received from the AMF{1} and/or the positioning capability information of at least one second LMC and/or information that a second base station is associated with the at least one second LMC, the AMF{2} may determine a target LMC associating/serving to the target base station. For example, based on the position information request parameter (e.g. at least one positioning type), and/or the positioning capability information of the at least one second LMC and/or information that a second base station is associated with the at least one second LMC, the AMF{2} may determine a target LMC associating/serving to the target base station. For example, the at least one positioning type may indicate an ECID positioning type and/or the priority of the at least one positioning type may indicate that ECID has a higher priority than other positioning types; the positioning capability information of the UE may indicate that the UE supports ECID and/or OTDOA; the positioning capability information of the LMC{2} may indicate that the LMC{2} supports ECID, OTDOA and/or WLAN positioning, and/or the LMC{2} is associating/serving for the BS{2}; based on above information, the AMF{2} may determine/select LMC{2} (e.g. as target LMC) associating/serving to the BS{2} (e.g. target base station). For example, the at least one positioning type may indicate an OTDOA positioning type; the positioning capability information of the UE may indicate that the UE supports ECID and/or OTDOA; the positioning capability information of the LMC{2} may indicate that the LMC{2} supports ECID positioning, and/or the LMC{2} is associating/serving for the BS{2}; the positioning capability information of the LMC{3} may indicate that the LMC{3} supports ECID, OTDOA and/or WLAN positioning, and/or the LMC{3} is not associating/serving for the BS{2}; based on above information, the AMF{2} may determine/select LMC {2} associating/serving to the BS{2}.

In an example action, the AMF{2} may determine/select a target base station based on the identity of BS{2} and/or the target cell ID. In an example action, the AMF{2} may send to the BS{2} a message (e.g. handover request). In an example, the handover request message may comprise the target LMC (e.g. LMC{2}) identifier. In an example, the handover request message may comprise one or more information elements received from the AMF{1}. For example, the handover request message may comprise the position information request or parameters/elements thereof (e.g. the at least one positioning type). For example, the handover request message may comprise the positioning capability of the UE.

In response to the message received from the AMF{2}, the BS{2} may send a response message (e.g. handover request acknowledge) to the AMF{2}. In an example action, in response to the message received from the BS{2} and/or in response to the message received from the AMF{1}, the AMF{2} may send a response message (e.g. Namf_Communication_CreateUEContext Response, Forward Relocation Response) to the AMP{1}.

In an example action, the AMF{2} may send a message (e.g. position information request) to the LMC{2} requesting the UE position. For example, the AMF{2} may send the positioning information request message before the handover is completed, e.g. before the AMF{2} receiving a Handover Notify message from the BS{2}. For example, the AMF{2} may send the positioning information request message after the handover is completed, e.g. after the AMF{2} received a Handover Notify message from the BS{2}. There may be other actions to complete the handover procedure. The position information request message may comprise one or more of the position information request parameters described above. The position information request message may comprise a second correlation ID indicating a second positioning transaction initiating by the AMF{2}.

In response to the message received from the AMF{2}, the LMC{2} may take one or more actions. The LMC{2} may take similar actions as LMC{1} as described above, e.g. determining a positioning type for the UE to measure the UE position/location; and/or the LMC{2} may send to the UE a message via the BS{2} requesting the UE position. In an example, there may be one or more actions for LMC{2} and/or the UE for the UE positioning procedure (e.g. to determine the position/location of the UE). For example, the LMC{2} may instigate location procedures internal to the BS{2}, e.g. to obtain positioning measurements or assistance data. The LMC{2} may also instigate location procedures with neighbor base stations, e.g. to obtain assistance data such as PRS configuration of TPs served by the neighbor NG-RAN node(s). For example, the LMC{2} may instigate location procedures with the UE, e.g. to obtain a location estimate or positioning measurements or to transfer location assistance data to the UE. For example, the UE may store any assistance data received from the LMC{2} and may perform any positioning measurements and/or location computation requested by the LMC{2}. For example, the UE may send to the LMC{2} a message (e.g. Positioning Information Response) via the BS{2}. The Positioning Information Response may comprise at least one of: the UE identity (e.g. GPSI, SUPI and/or PEI), the second correlation ID, the identity of the AMF{2} (e.g. an identifier and/or an address of the AMF{2}), locationEstimate, accuracyFulfilmentIndicator, ageOfLocationEstimate, velocityEstimate, civicAddress, positioningDataList, gnssPositioningDataList, ECGI, NCGI, altitude, and/or barometricPressure. The locationEstimate may indicate estimated location for the UE (e.g. an estimate of the location of the UE in universal coordinates and the accuracy of the estimate). The accuracyFulfilmentIndicator may indicate whether the requested accuracy was fulfilled or not. The ageOfLocationEstimate may indicate how long ago the location estimate was obtained. The velocityEstimate may indicate estimated velocity for the UE. The civicAddress may indicate address information of the UE (e.g. street, state, country). The positioningDataList may indicate the usage of each non-GANSS positioning method that was attempted to determine the location estimate, either successfully or unsuccessfully. The gnssPositioningDataList may indicate the usage of each GANSS positioning method that was attempted to determine the location estimate, either successfully or unsuccessfully. The E-UTRAN Cell Global Identifier (ECGI) may be used to identify cells globally. The ECGI may comprise a PLMN identity, a E-UTRAN Cell Identifier (ECI) and/or a network identifier. In 5G, the New Radio cell may be given a NR Cell Global Identity (NCGI). The NCGI may comprise a PLMN identity, a NR Cell Identity (NCI) and/or a network identifier. The altitude may indicate the height of the UE in relation to sea level or ground level. The barometricPressure may indicate a barometric pressure measurement (e.g. uncompensated atmospheric pressure in units of Pascal) as reported by the UE.

In response to the UE positioning procedure, based on the identity of the AMF{2} and/or the second correlation ID, the LMC{2} may send to the AMF{2} a message. For example, the LMC{2} may send to the AMF{2} a position information response. For example, the LMC{2} may send to the AMF{2} a Nlmf_Location_DetermineLocation response message. For example, the LMC{2} may use NGAP protocol for the message sent to the AMF{2}. For example, the LMC{2} may send a UPLINK UE ASSOCIATED NRPPA TRANSPORT message to the AMF{2}. For example, the LMC{2} may send a NGAP UL Transfer message to the AMF{2}, and the NGAP UL Transfer message may comprise a Nlmf_Location_DetermineLocation response message. The message (e.g. NGAP UL Transfer and/or Nlmf_Location_DetermineLocation response) sent by the LMC{2} to the AMF{2} may comprise any needed results, e.g. success or failure indication and, if requested and obtained, a location estimate for the UE. For example, the message (e.g. NGAP UL Transfer and/or Nlmf_Location_DetermineLocation response) sent by the LMC{2} to the AMF{2} may comprise the UE position/location information before the handover and/or the UE position/location information after the handover. For example, the UE position/location information may comprise at least one of: the locationEstimate, the accuracyFulfilmentIndicator, the ageOfLocationEstimate, the velocityEstimate, the civicAddress, the positioningDataList, the gnssPositioningDataList, the ECGI, the NCGI, the altitude, and/or the barometricPressure. For example, The message (e.g. NGAP UL Transfer and/or Nlmf_Location_DetermineLocation response) sent by the LMC{2} to the AMF{2} may comprise at least one of: the UE identity (e.g. GPSI, SUPI and/or PEI), the second correlation ID, and/or the identity of the AMF{2}.

In response to the message received from the LMC{2}, the AMF{2} may take one or more actions. In an example action, based on the GMLC identifier received from the AMF{1}, the AMF{2} may send to the GMLC a message (e.g. Positioning Information Response, Namf_Location_ProvidePositioningInfo Response) providing the location of the UE. The Namf_Location_ProvidePositioningInfo Response message may comprise at least one of: the UE identity (e.g. GPSI, SUPI and/or PEI), the correlation ID, the identity of the AMF{1}, the identity of the AMF{2}, a handover indication; the positioning type, the locationEstimate, the accuracyFulfilmentIndicator, the ageOfLocationEstimate, the velocityEstimate, the civicAddress, the positioningDataList, the gnssPositioningDataList, the ECGI, the NCGI, the altitude, and/or the barometricPressure.

In response to the message received from the AMF{2} and/or in response to the message received from the LCS client, the GMLC may send a response message (e.g. LCS Service Response) to the LCS client reporting the UE location. The LCS Service Response message may comprise at least one of: the UE identity (e.g. GPSI, SUPI and/or PEI), the positioning type, the locationEstimate, the accuracyFulfilmentIndicator, the ageOfLocationEstimate, the velocityEstimate, the civicAddress, the positioningDataList, the gnssPositioningDataList, the ECGI, the NCGI, the altitude, and/or the barometricPressure. In an example, there may be other actions (e.g. the interaction with an SMF) to complete the handover procedure.

Figure 24:
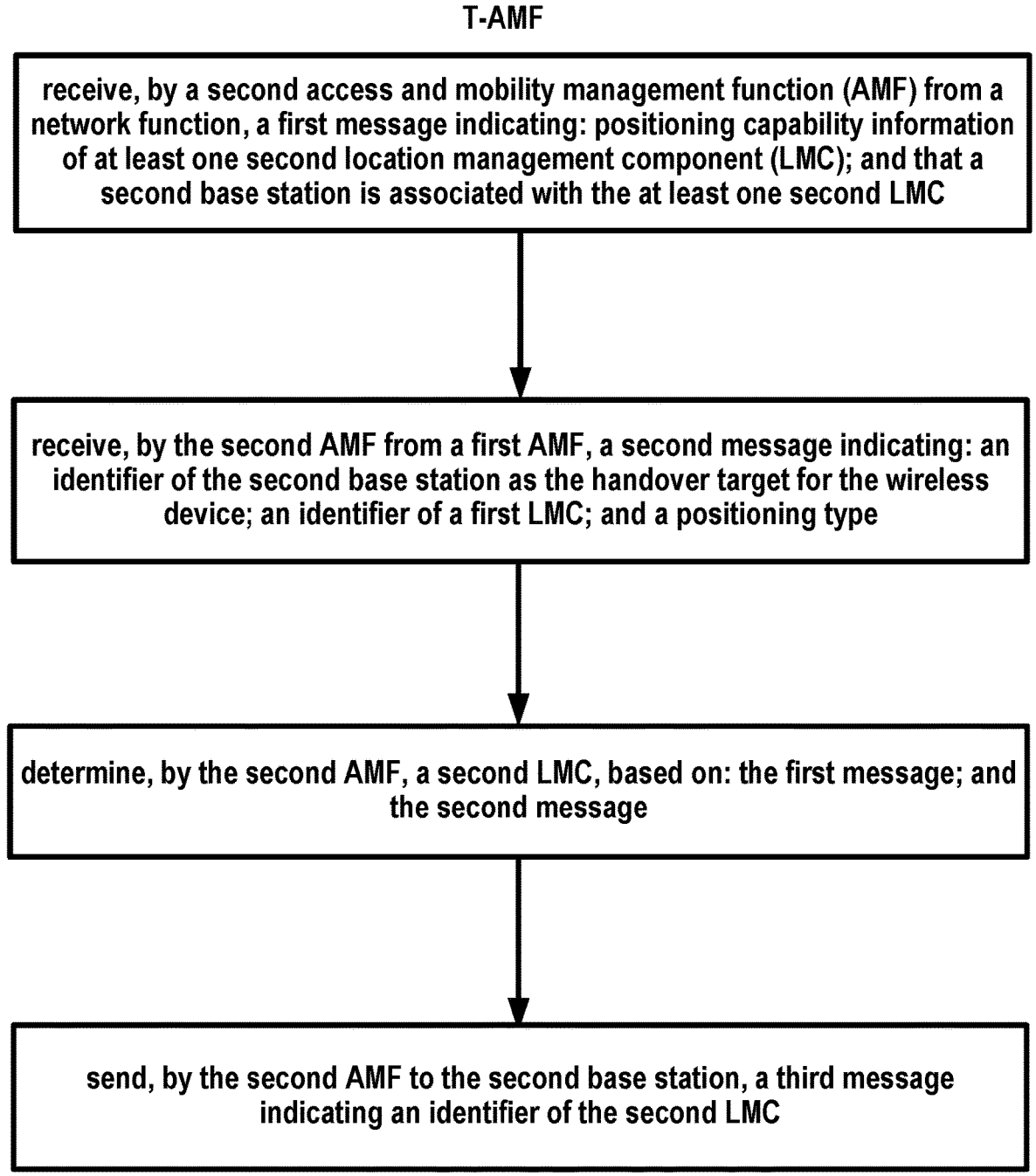
FIG. 24 is an example diagram depicting the procedures of a target AMF as per an aspect of an embodiment of the present disclosure.

FIG. 24 is an example diagram depicting the procedures of a target AMF/AMF{2} as per an aspect of an embodiment of the present disclosure.

Figure 25:
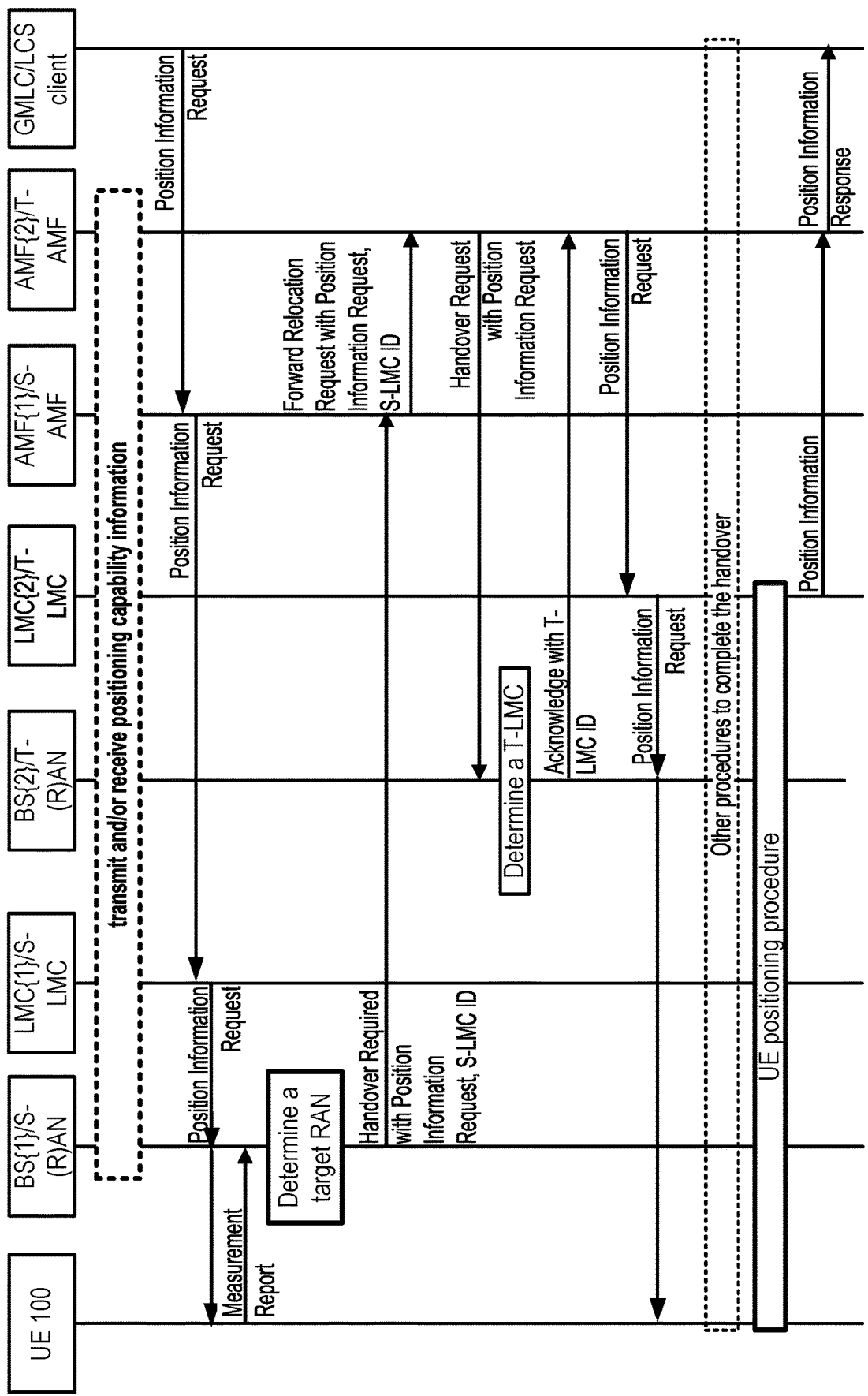
FIG. 25 is an example call flow as per an aspect of an embodiment of the present disclosure.

FIG. 25 shows an example call flow which may comprise one or more actions. Before the AMF{2} receives the message from the AMF{1}, this embodiment may have the similar processes described above with respect to FIG. 21. For brevity, further description will not be repeated here.

In response to the message received from BS{1}, the AMF{1} may determine/select an AMF (e.g. a target AMF/AMF{2}) based on the information received from the BS{1} (e.g. the identity of BS{2} and/or the target cell ID). In an example, the AMF{1} may send to the AMF{2} a handover message (e.g. Namf_Communication_CreateUEContext Request, Forward Relocation Request). In an example, the handover message sent to the AMF{2} may comprise one or more information elements of the handover required message. For example, the Namf_Communication_CreateUEContext Request message may comprise the position information request or parameters/elements thereof (e.g. the at least one positioning type). For example, the Namf_Communication_CreateUEContext Request message may comprise the LMC{1} identifier. For example, the Namf_Communication_CreateUEContext Request message may comprise the GMLC identifier. For example, the Namf_Communication_CreateUEContext Request message may comprise the positioning capability of the UE.

In response to the message received from the AMF{1} (e.g. source AMF), the AMF{2} (e.g. target AMF) may take one or more actions. In an example action, the AMF{2} may determine/select a target base station based on the identity of BS{2} and/or the target cell ID. In an example action, the AMF{2} may send to the BS{2} (e.g. target base station) a message (e.g. handover request). In an example, the handover request message may comprise one or more information elements received from the AMF{1}. For example, the handover request message may comprise the position information request or parameters/elements thereof (e.g. the at least one positioning type). For example, the handover request message may comprise the positioning capability of the UE.

In an example, the BS{2} may obtain the positioning capability information of at least one second LMC and/or information that a second base station is associated with the at least one second LMC by local configuration. In an example, the BS{2} may obtain the positioning capability information of at least one second LMC and/or information that a second base station is associated with the at least one second LMC by receiving it from the at least one second LMC, e.g., the at least one second LMC may send to the BS{2} the positioning capability information of at least one second LMC and/or information that the second base station is associated with the at least one second LMC. In an example, the BS{2} may obtain the positioning capability information of at least one second LMC and/or information that a second base station is associated with the at least one second LMC by receiving them (it) from another network entity (e.g. AMF, OAM, NRF, and/or the like). In an example, the AMF, OAM and/or NRF may have positioning capability information of at least one second LMC and/or information that a second base station is associated with the at least one second LMC (e.g. LMCs in an AMF serving area and/or a tracking area, LMCs in an OAM/NRF serving area) by local configuration. In an example, the AMF and/or NRF may receive positioning capability information of at least one second LMC and/or information that a second base station is associated with the at least one second LMC from another network function (e.g. OAM). For example, the AMF/OAM/NRF may receive positioning capability information of at least one second LMC and/or information that a second base station is associated with the at least one second LMC from the at least one second LMC. For example, the AMF/OAM/NRF may send positioning capability information of at least one second LMC and/or information that a second base station is associated with the at least one second LMC to the AMF(s) (e.g. the second AMF) to other network entity (e.g. BS{2}) in the AMF/OAM/NRF serving area.

The positioning capability information of the at least one second LMC may indicate whether the at least one second LMC supports UE positioning. The positioning capability information may indicate a type of UE positioning that is supported by the LMC. As an example, the positioning capability information may comprise at least one of: a parameter indicating support of an LMC connected/associated to a base station (e.g. as shown in FIG. 19); a parameter indicating support of Enhanced Cell Identity (ECID) capability; a parameter indicating support of Observed Time Difference of Arrival (OTDOA) capability; a parameter indicating support of network-assisted GNSS methods; a parameter indicating support of WLAN positioning; a parameter indicating support of Bluetooth positioning; a parameter indicating support of Terrestrial Beacon System (TB S) positioning; a parameter indicating support of barometric pressure sensor (BPS) positioning; a parameter indicating no support of a positioning capability; and an identifier of an LMC (LMC ID).

In an example action, based on the information received from the AMF{2} and/or the positioning capability information of at least one second LMC and/or information that a second base station is associated with the at least one second LMC, the BS{2} may determine a target LMC associating/serving to the BS{2}(e.g. target base station). For example, based on the position information request parameter (e.g. at least one positioning type), and/or the positioning capability information of the at least one second LMC and/or information that a second base station is associated with the at least one second LMC, the BS{2} may determine a target LMC associating/serving to the BS{2}. For example, the at least one positioning type may indicate an ECID positioning type and/or the priority of the at least one positioning type may indicate that ECID has a higher priority than other positioning types; the positioning capability information of the UE may indicate that the UE supports ECID and/or OTDOA; the positioning capability information of the LMC{2} may indicate that the LMC{2} supports ECID, OTDOA and/or WLAN positioning, and/or the LMC{2} is associating/serving for the BS{2}; based on above information, the BS{2} may determine/select LMC{2} (e.g. as target LMC) associating/serving to the BS{2}. For example, the at least one positioning type may indicate an OTDOA positioning type; the positioning capability information of the UE may indicate that the UE supports ECID and/or OTDOA; the positioning capability information of the LMC{2} may indicate that the LMC{2} supports ECID positioning, and/or the LMC{2} is associating/serving for the BS{2}; the positioning capability information of the LMC{3} may indicate that the LMC{3} supports ECID, OTDOA and/or WLAN positioning, and/or the LMC{3} is not associating/serving for the BS{2}; based on above information, the BS{2} may determine/select LMC{2} associating/serving to the BS{2}.

In an example action, the BS{2} may send a response message (e.g. handover request acknowledge) to the AMF{2}, the handover request acknowledge message may comprise the LMC{2} identifier.

In an example, in response to the message received from the BS{2} and/or in response to the message received from the AMF{1}, the AMF{2} may send a response message (e.g. Namf_Communication_CreateUEContext Response, Forward Relocation Response) to the AMF{1}.

In an example, based on the LMC{2} identifier received from the BS{2}, the AMF{2} may send a message (e.g. position information request) to the LMC{2} requesting the UE position. There may be similar processes for the UE positioning procedure described above with respect to FIG. 21. For brevity, further description will not be repeated here.

FIG. 26 is an example diagram depicting the procedures of a target base station/BS{2} as per an aspect of an embodiment of the present disclosure.

Figure 27:
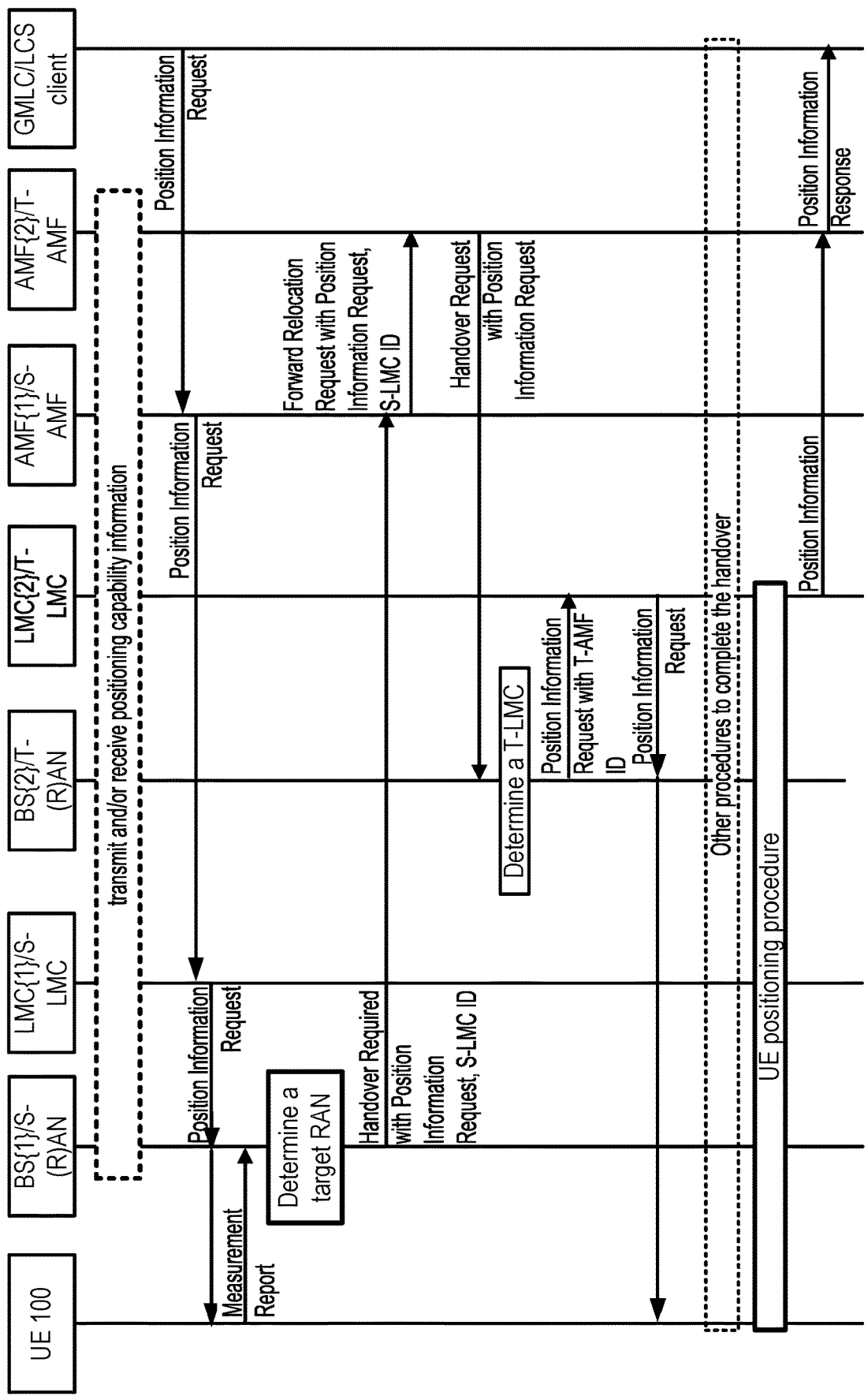
FIG. 27 is an example call flow as per an aspect of an embodiment of the present disclosure.

FIG. 27 shows an example call flow which may comprise one or more actions. Before the AMF{2} receives the message from the AMF{1}, this embodiment may have the similar processes described above with respect to FIG. 21. For brevity, further description will not be repeated here.

In response to the message received from BS{1}, the AMF{1} may determine/select an AMF (e.g. a target AMF/AMF{2}) based on the information received from the BS{1} (e.g. the identity of BS{2} and/or the target cell ID). In an example, the AMF{1} may send to the AMF{2} a handover message (e.g. Namf_Communication_CreateUEContext Request, Forward Relocation Request). In an example, the handover message sent to the AMF{2} may comprise one or more information elements of the handover required message. For example, the Namf_Communication_CreateUEContext Request message may comprise the position information request or parameters/elements thereof (e.g. the at least one positioning type). For example, the Namf_Communication_CreateUEContext Request message may comprise the LMC{1} identifier. For example, the Namf_Communication_CreateUEContext Request message may comprise the GMLC identifier. For example, the Namf_Communication_CreateUEContext Request message may comprise the positioning capability of the UE.

In response to the message received from the AMF{1} (e.g. source AMF), the AMF{2} (e.g. target AMF) may take one or more actions. In an example action, the AMF{2} may determine/select a target base station based on the identity of BS{2} and/or the target cell ID. In an example action, the AMF{2} may send to the BS{2} (e.g. target base station) a message (e.g. handover request). In an example, the handover request message may comprise one or more information elements received from the AMF{1}. For example, the handover request message may comprise the position information request or parameters/elements thereof (e.g. the at least one positioning type). For example, the handover request message may comprise the positioning capability of the UE.

In an example, the BS{2} may obtain the positioning capability information of at least one second LMC and/or information that a second base station is associated with the at least one second LMC by local configuration. In an example, the BS{2} may obtain the positioning capability information of at least one second LMC and/or information that a second base station is associated with the at least one second LMC by receiving it from the at least one second LMC, e.g., the at least one second LMC may send to the BS{2} the positioning capability information of at least one second LMC and/or information that the second base station is associated with the at least one second LMC. In an example, the BS{2} may obtain the positioning capability information of at least one second LMC and/or information that a second base station is associated with the at least one second LMC by receiving them (it) from another network entity (e.g. AMF, OAM, NRF, and/or the like). In an example, the AMF, OAM and/or NRF may have positioning capability information of at least one second LMC and/or information that a second base station is associated with the at least one second LMC (e.g. LMCs in an AMF serving area and/or a tracking area, LMCs in an OAM/NRF serving area) by local configuration. In an example, the AMF and/or NRF may receive positioning capability information of at least one second LMC and/or information that a second base station is associated with the at least one second LMC from another network function (e.g. OAM). For example, the AMF/OAM/NRF may receive positioning capability information of at least one second LMC and/or information that a second base station is associated with the at least one second LMC from the at least one second LMC. For example, the AMF/OAM/NRF may send positioning capability information of at least one second LMC and/or information that a second base station is associated with the at least one second LMC to the AMF(s) (e.g. the second AMF) to other network entity (e.g. BS{2}) in the AMF/OAM/NRF serving area.

The positioning capability information of the at least one second LMC may indicate whether the at least one second LMC supports UE positioning. The positioning capability information may indicate a type of UE positioning that is supported by the LMC. As an example, the positioning capability information may comprise at least one of: a parameter indicating support of an LMC connected/associated to a base station (e.g. as shown in FIG. 19); a parameter indicating support of Enhanced Cell Identity (ECID) capability; a parameter indicating support of Observed Time Difference of Arrival (OTDOA) capability; a parameter indicating support of network-assisted GNSS methods; a parameter indicating support of WLAN positioning; a parameter indicating support of Bluetooth positioning; a parameter indicating support of Terrestrial Beacon System (TBS) positioning; a parameter indicating support of barometric pressure sensor (BPS) positioning; a parameter indicating no support of a positioning capability; and an identifier of an LMC (LMC ID).

In an example action, based on the information received from the AMF{2} and/or the positioning capability information of at least one second LMC and/or information that a second base station is associated with the at least one second LMC, the BS{2} may determine a target LMC associating/serving to the BS{2}(e.g. target base station). For example, based on the position information request parameter (e.g. at least one positioning type), and/or the positioning capability information of the at least one second LMC and/or information that a second base station is associated with the at least one second LMC, the BS{2} may determine a target LMC associating/serving to the BS{2}. For example, the at least one positioning type may indicate an ECID positioning type and/or the priority of the at least one positioning type may indicate that ECID has a higher priority than other positioning types; the positioning capability information of the UE may indicate that the UE supports ECID and/or OTDOA; the positioning capability information of the LMC{2} may indicate that the LMC{2} supports ECID, OTDOA and/or WLAN positioning, and/or the LMC{2} is associating/serving for the BS{2}; based on above information, the BS{2} may determine/select LMC{2} (e.g. as target LMC) associating/serving to the BS{2}. For example, the at least one positioning type may indicate an OTDOA positioning type; the positioning capability information of the UE may indicate that the UE supports ECID and/or OTDOA; the positioning capability information of the LMC{2} may indicate that the LMC{2} supports ECID positioning, and/or the LMC{2} is associating/serving for the BS{2}; the positioning capability information of the LMC{3} may indicate that the LMC{3} supports ECID, OTDOA and/or WLAN positioning, and/or the LMC{3} is not associating/serving for the BS{2}; based on above information, the BS{2} may determine/select LMC{2} associating/serving to the BS{2}.

In an example action, the BS{2} may send a response message (e.g. handover request acknowledge) to the AMF{2}, the handover request acknowledge message may comprise the LMC {2} identifier.

In an example, in response to the message received from the BS{2} and/or in response to the message received from the AMF{1}, the AMF{2} may send a response message (e.g. Namf_Communication_CreateUEContext Response, Forward Relocation Response) to the AMF{1}.

In an example action, based on the LMC{2} identifier, the BS{2} may send a message (e.g. position information request) to the LMC{2} requesting the UE position. The position information request message may comprise the position information request or parameters/elements thereof (e.g. the at least one positioning type). For example, the position information request message may comprise the LMC{1} identifier. For example, the position information request message may comprise the GMLC identifier. For example, the position information request message may comprise the AMF{2} identifier. For example, the position information request message may comprise the positioning capability of the UE. For example, the position information request message may comprise a second correlation ID indicating a second positioning transaction initiating by the BS{2}. For example, the BS{2} may send the positioning information request message after the handover is completed. There may be other actions to complete the handover procedure.

In response to the message received from the BS{2}, the LMC{2} may take one or more actions. The LMC{2} may take similar actions as LMC{1} as described above, e.g. determining a positioning type for the UE to measure the UE position/location; and/or the LMC{2} may send to the UE a message via the BS{2} requesting the UE position. The content of the message sent by the LMC{2} to the UE may be similar to the message sent to the UE by the LMC{1}. In an example, there may be one or more actions for LMC{2} and/or the UE for the UE positioning procedure (e.g. to determine the position/location of the UE). For example, the LMC{2} may instigate location procedures internal to the BS{2}, e.g. to obtain positioning measurements or assistance data. The LMC{2} may also instigate location procedures with neighbor base stations, e.g. to obtain assistance data such as PRS configuration of TPs served by the neighbor NG-RAN node(s). For example, the LMC{2} may instigate location procedures with the UE, e.g. to obtain a location estimate or positioning measurements or to transfer location assistance data to the UE. For example, the UE may store any assistance data received from the LMC{2} and may perform any positioning measurements and/or location computation requested by the LMC{2}. For example, the UE may send to the LMC{2} a message (e.g. Positioning Information Response) via the BS{2}. The Positioning Information Response may comprise at least one of: the UE identity (e.g. GPSI, SUPI and/or PEI), the second correlation ID, the AMF{2} identifier (e.g. an identifier and/or an address of the AMF{2}), locationEstimate, accuracyFulfilmentIndicator, ageOfLocationEstimate, velocityEstimate, civicAddress, positioningDataList, gnssPositioningDataList, ECGI, NCGI, altitude, and/or barometricPressure. The locationEstimate may indicate estimated location for the UE (e.g. an estimate of the location of the UE in universal coordinates and the accuracy of the estimate). The accuracyFulfilmentIndicator may indicate whether the requested accuracy was fulfilled or not. The ageOfLocationEstimate may indicate how long ago the location estimate was obtained. The velocityEstimate may indicate estimated velocity for the UE. The civicAddress may indicate address information of the UE (e.g. street, state, country). The positioningDataList may indicate the usage of each non-GANSS positioning method that was attempted to determine the location estimate, either successfully or unsuccessfully. The gnssPositioningDataList may indicate the usage of each GANSS positioning method that was attempted to determine the location estimate, either successfully or unsuccessfully. The E-UTRAN Cell Global Identifier (ECGI) may be used to identify cells globally. The ECGI may comprise a PLMN identity, a E-UTRAN Cell Identifier (ECI) and/or a network identifier. In 5G, the New Radio cell may be given a NR Cell Global Identity (NCGI). The NCGI may comprise a PLMN identity, a NR Cell Identity (NCI) and/or a network identifier. The altitude may indicate the height of the UE in relation to sea level or ground level. The barometricPressure may indicate a barometric pressure measurement (e.g. uncompensated atmospheric pressure in units of Pascal) as reported by the UE.

In response to the UE positioning procedure, based on the identity of the AMF{2} and/or the second correlation ID, the LMC{2} may send to the AMF{2} a message. For example, the LMC{2} may send to the AMF{2} a position information response. For example, the LMC{2} may send to the AMF{2} a Nlmf_Location_DetermineLocation response message. For example, the LMC{2} may use NGAP protocol for the message sent to the AMF{2}. For example, the LMC{2} may send a UPLINK UE ASSOCIATED NRPPA TRANSPORT message to the AMF{2}. For example, the LMC{2} may send a NGAP UL Transfer message to the AMF{2}, and the NGAP UL Transfer message may comprise a Nlmf_Location_DetermineLocation response message. The message (e.g. NGAP UL Transfer and/or Nlmf_Location_DetermineLocation response) sent by the LMC{2} to the AMF{2} may comprise any needed results, e.g. success or failure indication and, if requested and obtained, a location estimate for the UE. For example, the message (e.g. NGAP UL Transfer and/or Nlmf_Location_DetermineLocation response) sent by the LMC{2} to the AMF{2} may comprise the UE position/location information before the handover and/or the UE position/location information after the handover. For example, the UE position/location information may comprise at least one of: the locationEstimate, the accuracyFulfilmentIndicator, the ageOfLocationEstimate, the velocityEstimate, the civicAddress, the positioningDataList, the gnssPositioningDataList, the ECGI, the NCGI, the altitude, and/or the barometricPressure. For example, The message (e.g. NGAP UL Transfer and/or Nlmf_Location_DetermineLocation response) sent by the LMC{2} to the AMF{2} may comprise at least one of: the UE identity (e.g. GPSI, SUPI and/or PEI), the second correlation ID, and/or the identity of the AMF{2}.

In response to the message received from the LMC{2}, the AMF{2} may take one or more actions. In an example action, based on the GMLC identifier received from the AMF{1}, the AMF{2} may send to the GMLC a message (e.g. Positioning Information Response, Namf_Location_ProvidePositioningInfo Response) providing the location of the UE. The Namf_Location_ProvidePositioningInfo Response message may comprise at least one of: the UE identity (e.g. GPSI, SUPI and/or PEI), the correlation ID, the identity of the AMF{1}, the identity of the AMF{2}, a handover indication; the positioning type, the locationEstimate, the accuracyFulfilmentIndicator, the ageOfLocationEstimate, the velocityEstimate, the civicAddress, the positioningDataList, the gnssPositioningDataList, the ECGI, the NCGI, the altitude, and/or the barometricPressure.

In response to the message received from the AMF{2} and/or in response to the message received from the LCS client, the GMLC may send a response message (e.g. LCS Service Response) to the LCS client reporting the UE location. The LCS Service Response message may comprise at least one of: the UE identity (e.g. GPSI, SUPI and/or PEI), the positioning type, the locationEstimate, the accuracyFulfilmentIndicator, the ageOfLocationEstimate, the velocityEstimate, the civicAddress, the positioningDataList, the gnssPositioningDataList, the ECGI, the NCGI, the altitude, and/or the barometricPressure. In an example, there may be other actions (e.g. the interaction with an SMF) to complete the handover procedure.

FIG. 28 is an example diagram depicting the procedures of a target base station BS{2}/T-(R)AN as per an aspect of an embodiment of the present disclosure.

Figure 29:
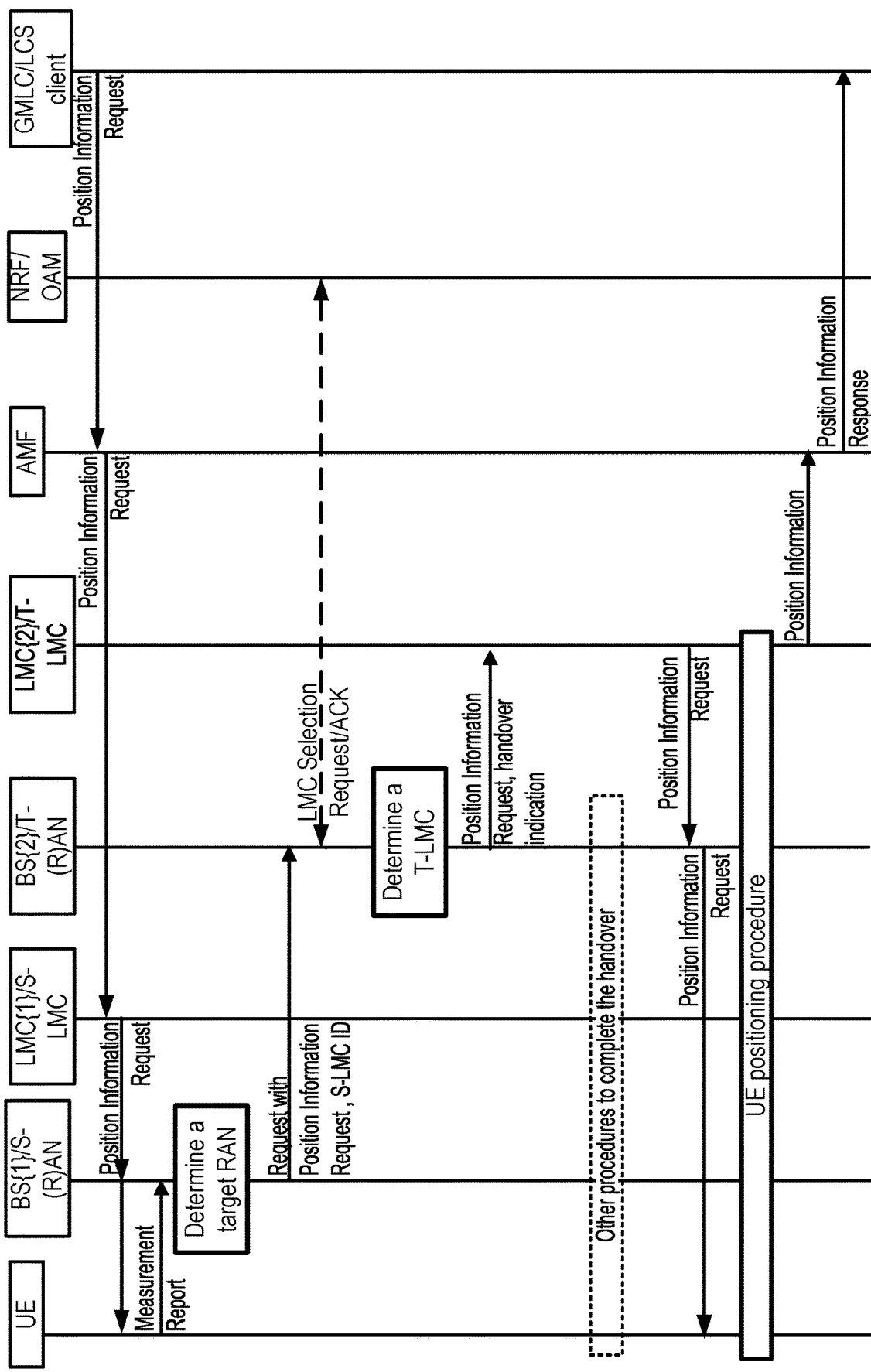
FIG. 29 is an example call flow as per an aspect of an embodiment of the present disclosure.

FIG. 29 shows an example call flow which may comprise one or more actions. In an example, a gateway mobile location center (GMLC) may receive a request message for location services (LCS). The request message may be received from an LCS client. The request message may request a location of a particular UE (e.g., the UE illustrated in the figure). The LCS service request message may comprise a position information request (message). The position information request may have one or more information elements/parameters as described above with respect to FIG. 21.

In response to the message received from the LCS client, the GMLC may send a message (e.g. Nudm_UECM_Get) to a home UDM of the UE (not shown). The message may comprise one or more of the position information request parameters (e.g. parameters in the position information request message) described above, for example, the UE identity (e.g. GPSI and/or SUPI). The home UDM may send serving AMF information (e.g. AMF identity and/or AMF address) of the UE to the GMLC. In response to the message received from the LCS client and/or the message received from the UDM, the GMLC may send to the (serving) AMF a message (illustrated as positioning information request). The position information request may comprise one or more of the position information request parameters described above, for example, one or more of the parameters included in the LCS service request. The position information request may be a Namf_Location_ProvidePositioningInfo service operation to request the current location of the UE.

In response to the message received from the GMLC, based on UE registration information and/or UE subscription information, the AMF may determine that the first LMC (e.g. illustrated in the figure as LMC{1}/S-LMC) and/or the first base station (e.g. illustrated in the figure as BS{1}/S-(R)AN) are (is) serving for the UE. The AMF may send a message to the LMC{1} requesting the UE position. The message may be a position information request. The position information request may comprise one or more of the position information request parameters described above, for example, one or more of the parameters received from the GMLC. The position information request (message) may have one or more elements/parameters as described above with respect to FIG. 21.

In response to the message received from the AMF, the LMC{1} may take one or more actions. In an example action, based on the message received from the AMF and/or the positioning capability information of the UE, the LMC{1} may determine a positioning type for the UE to measure the UE position/location as described above with respect to FIG. 21.

In an example action, the LMC{1} may send to the UE a message via the BS{1}. The message may request the UE position. The message may be a position information request. The position information request (message) may comprise one or more of the position information request parameters as described above with respect to FIG. 21.

In response to the message received from the LMC{1}, the UE may perform (or attempt to perform) a UE positioning procedure as described above with respect to FIG. 21.

During the UE positioning procedure (e.g. before the UE has started/finished the UE positioning procedure), the UE may move to a new area (e.g. new cell, new tracking area). The UE may send measurement report to BS{1}. The measurement report may comprise a radio signal measurement of one or more cells and/or base stations. In response to the message received from the UE, BS{1} may take one or more actions. In an example action, based on the measurement report, BS{1} may determine a handover for the UE.

In an example, a base station (e.g. BS{1}) may have the configuration information that a list of base stations (e.g. BS{1}, BS{2}, etc.) is served by the same LMC (e.g. LMC{1}). In an example, a base station may receive from a network function (e.g. LMC, AMF, OAM, NRF, and/or the like) the configuration information that a list of base stations is served by the same LMC (e.g. LMC{1}).

In an example action, based on the measurement report of one or more cells and/or base stations, and/or based on the configuration information that a list of base stations is served by the same LMC, the BS{1} (e.g. source base station) may determine a target base station for the handover. For example, the BS{1} may determine a target base station that both the BS{1} and the target base station are served by the same LMC. For example, the measurement report may indicate that the radio signal of BS{3} is better than the radio signal of BS{2} (e.g. illustrated in the figure as BS{2}/T-(R)AN); and/or the configuration information may indicate that BS{1} and BS{3} are served by the same LMC, based on above information, BS{1} may determine/select the BS{3} as the target base station. For example, the measurement report may indicate that the radio signal of BS{3} is better than the radio signal of BS{2}; and/or the configuration information may indicate that BS{1} and BS{2} are served by the same LMC, based on above information, BS{1} may determine/select the BS{2} as the target base station. For example, the measurement report may indicate that the radio signal of BS{2} is better than the radio signal of other base stations; and/or the configuration information may indicate that BS{1} is served by the LMC{1}, and other base stations are not served by the LMC{1}, based on above information, BS{1} may determine/select the BS{2} as the target base station.

In an example, the BS{1} (e.g. source base station) may send a message (e.g. handover request) to the BS{2} (e.g. target base station) for the handover. In an example, the handover request message may comprise the position information request or parameters/elements thereof. In an example, the handover request message may comprise the LMC{1} identifier. In an example, the handover request message may comprise the positioning capability of the UE. In an example, the BS{1} may have the positioning capability of the UE by local configuration. In an example, the BS{1} may receive the positioning capability of the UE from the UE. In an example, the BS{1} may receive the positioning capability of the UE from a network entity (e.g. LMC, AMF, OAM, NRF and/or the like). In an example, the handover request message may comprise PDU session related information, and/or UE reported measurement information comprising beam-related information if available. The PDU session related information may comprise the slice information and/or QoS flow level QoS profile(s).

In response to the message received from the BS{1}, the BS{2} may take one or more actions. In an example action, the BS{2} may determine/select a LMC serving/associating to the BS{2}. In an example, the BS{2} may determine/select a LMC based on local configuration information. For example, the BS{2} may have positioning capability information of at least one second LMC and/or information that a second base station is associated with the at least one second LMC by local configuration. For example, the BS{2} may send a message (e.g. LMC selection request) to a network entity (e.g. NRF/OAM as illustrated in the figure) requesting a LMC. The LMC selection request message may comprise one or more of the position information request parameters (e.g. parameters in the position information request message) described above, for example, the UE identity (e.g. GPSI and/or SUPI), the at least one positioning type. The LMC selection request message may comprise the positioning capability of the UE. The LMC selection request message may comprise the BS{2} identifier.

In response to the message received from the BS{2}, based on the information received from the BS{2}, and/or positioning capability information of at least one second LMC and/or information that a second base station is associated with the at least one second LMC, the NRF/OAM may determine/select a LMC (e.g. LMC{2}) serving/associating to the BS{2}. The NRF/OAM may send a response message (LMC selection response) comprising at least one of: the LMC{2} identifier, and/or the UE identity.

In an example, the BS{2} may obtain the positioning capability information of at least one second LMC and/or information that a second base station is associated with the at least one second LMC as described above with respect to FIG. 27. In an example, the BS{2} may obtain the positioning capability information of at least one second LMC and/or information that a second base station is associated with the at least one second LMC by receiving it from the at least one second LMC, e.g., the at least one second LMC may send to the BS{2} the positioning capability information of at least one second LMC and/or information that the second base station is associated with the at least one second LMC. In an example, the BS{2} may obtain the positioning capability information of at least one second LMC and/or information that a second base station is associated with the at least one second LMC by receiving them (it) from another network entity (e.g. AMF, OAM, NRF, and/or the like). In an example, the AMF, OAM and/or NRF may have positioning capability information of at least one second LMC and/or information that a second base station is associated with the at least one second LMC (e.g. LMCs in an AMF serving area and/or a tracking area, LMCs in an OAM/NRF serving area) by local configuration. In an example, the AMF and/or NRF may receive positioning capability information of at least one second LMC and/or information that a second base station is associated with the at least one second LMC from another network function (e.g. OAM). For example, the AMF/OAM/NRF may receive positioning capability information of at least one second LMC and/or information that a second base station is associated with the at least one second LMC from the at least one second LMC. For example, the AMF/OAM/NRF may send positioning capability information of at least one second LMC and/or information that a second base station is associated with the at least one second LMC to the AMF(s) (e.g. the second AMF) to other network entity (e.g. BS{2}) in the AMF/OAM/NRF serving area.

In an example action, based on the information received from the BS{1} and/or the positioning capability information of at least one second LMC and/or information that a second base station is associated with the at least one second LMC, the BS{2} may determine a target LMC associating/serving to the BS{2}(e.g. target base station) as described above with respect to FIG. 27.

In an example action, based on the LMC{2} identifier, the BS{2} may send a message (e.g. position information request) to the LMC{2} requesting the UE position. The position information request message may comprise a handover indication. In an example, the second base station may send to the second LMC, a positioning request message comprising: a handover indication; and/or the positioning information request message. The UE positioning procedure may be similar as described above with respect to FIG. 27.

In an example, a second AMF may receive from a network function, a first message indicating: positioning capability information of at least one second location management component (LMC); and that a second base station is associated with the at least one second LMC. In an example, the second AMF may receive from a first AMF a second message. The second message may indicate an identifier of the second base station as the handover target for the wireless device. The second message may indicate an identifier of a first LMC. The second message may indicate a positioning type. In an example, based on the first message and/or the second message, the second AMF may determine a second LMC. In an example, the second AMF may send to the second base station a third message indicating an identifier of the second LMC.

In an example embodiment, a first base station may receive from a network function, configuration information that a list of base stations is served by the first LMC. In an example embodiment, the first base station may be one of the list of base stations. In an example embodiment, the first base station may receive from the wireless device a measurement report. In an example embodiment, based on the measurement report and/or the configuration information that the list of base stations is served by the first LMC, the first base station may determine a second base station for a handover of the wireless device. In an example embodiment, the first base station may send to the first AMF a handover required message comprising a position information request message. In an example embodiment, the position information request message may comprise a positioning type. In an example embodiment, the first base station may send to the first AMF, a handover required message comprising a first LMC identifier. In an example embodiment, the handover required message may comprise a positioning capability of the wireless device. In an example embodiment, the determining may be further based on positioning capability information of the wireless device. In an example embodiment, the third message may further comprise the second message. In an example embodiment, the network function may comprise at least one of: the at least one second base station; the at least one second LMC; an NRF; and/or an OAM. In an example embodiment, the positioning capability information may comprise at least one of: supporting an LMC connects to a base station; supporting Enhanced Cell Identity (ECID) capability; supporting Observed Time Difference of Arrival (OTDOA) capability; supporting network-assisted GNSS methods; supporting WLAN positioning; supporting Bluetooth positioning; supporting Terrestrial Beacon System (TBS) positioning; supporting barometric pressure sensor positioning; no support of a positioning capability; and/or an identifier of an LMC (LMC ID). In an example embodiment, the second message may further comprise a GMLC identifier. In an example embodiment, the second message may further comprise a positioning capability of the wireless device. In an example embodiment, the second message may further comprise a position information request message. In an example embodiment, the position information request message may further comprise a positioning type. In an example embodiment, the positioning type may comprise at least one of: positioning of Enhanced Cell Identity (ECID); positioning of Observed Time Difference of Arrival (OTDOA); WLAN positioning; Bluetooth positioning; Terrestrial Beacon System (TBS) positioning; barometric pressure sensor positioning; and/or an accuracy of positioning. In an example embodiment, the first AMF may receive from an GMLC, a position information request message comprising at least one of: the positioning type; a priority of the positioning type; and/or a UE identity. In an example embodiment, the GMLC may receive from an LCS client, a position information request message comprising at least one of: the positioning type; the priority of the positioning type; or the UE identity.

In an example, a second base station may receive from a network function, a first message indicating: positioning capability information of at least one second location management component (LMC); and/or that the second base station is associated with the at least one second LMC. In an example, the second base station may receive from an access and mobility management function (AMF), a handover request message indicating: an identifier of a first LMC; and/or a positioning type. In an example, based on the first message and/or the handover request message, the second base station may determine a second LMC associated with the second base station. In an example, the second base station may send to the AMF, a handover acknowledge message indicating an identifier of the second LMC.

In an example, a second base station may receive from a network function a first message indicating: positioning capability information of at least one second location management component (LMC); and/or that the second base station is served by the at least one second LMC. In an example, the second base station may receive from an access and mobility management function (AMF), a handover request message indicating: an identifier of a first LMC; and/or a positioning type. In an example, based on the first message; and/or the handover request message, the second base station may determine a second LMC associated with the second base station. In an example, the second base station may send to the second LMC, a position information request message indicating an identifier of the AMF.

In an example, a second base station may receive from a network function a first message indicating: positioning capability information of at least one second location management component (LMC); and/or that the second base station is served by the at least one second LMC. In an example, a second base station may receive from a first base station, a handover request message comprising: a positioning information request message for a wireless device; and/or an identifier of a first location management component (LMC), wherein the first LMC is associated with the first base station. In an example, based on the first message and/or the handover request message, the second base station may determine a second LMC associated with the second base station. In an example, the second base station may send to the second LMC, a positioning request message comprising: a handover indication; and/or the positioning information request message.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a second access and mobility management function (AMF), a first message comprising positioning capability information indicating that a location management component (LMC) supports one or more positioning types;
   receiving, by the second AMF from a first AMF, a second message indicating a positioning type of a wireless device;
   determining, by the second AMF, the LMC, based on:
      the positioning type; and
      the positioning capability information; and
   sending, by the second AMF to a base station associated with the LMC, a third message comprising an identifier of the LMC.

2. The method of claim 1, wherein the first message indicates that the base station is associated with the LMC.

3. The method of claim 1, wherein the first message comprises positioning capability information of a plurality of LMCs comprising the LMC.

4. The method of claim 3, wherein the positioning capability information indicates one or more of the one or more positioning types that is supported by each of the plurality of LMCs.

5. The method of claim 1, wherein the second message indicates that a handover is required for the wireless device.

6. The method of claim 1, wherein the second message comprises an identifier of the base station as a handover target for the wireless device.

7. The method of claim 1, wherein the second message comprises an identifier of a gateway mobile location center (GMLC).

8. The method of claim 1, wherein the second message indicates a positioning capability of the wireless device.

9. The method of claim 1, wherein the one or more positioning types comprise one or more of:
   enhanced cell identity (ECID);
   time difference of arrival (OTDOA);
   network-assisted GNSS;
   WLAN positioning;
   Bluetooth positioning;
   terrestrial beacon system (TBS) positioning; and
   barometric pressure sensor positioning.

10. The method of claim 1, wherein the one or more positioning types indicate an accuracy of positioning.

11. A second access and mobility management function (AMF) comprising:
   one or more processors; and
   memory storing instructions that, when executed by the one or more processors, cause the second AMF to:
      receive a first message comprising positioning capability information indicating that a location management component (LMC) supports one or more positioning types;
      receive, from a first AMF, a second message indicating a positioning type of a wireless device;
      determine the LMC based on:
         the positioning type; and
         the positioning capability information; and
      send, to a base station associated with the LMC, a third message comprising an identifier of the LMC.

12. The second AMF of claim 11, wherein the first message comprises positioning capability information of a plurality of LMCs comprising the LMC.

13. The second AMF of claim 12, wherein the positioning capability information indicates one or more of the one or more positioning types that is supported by each of the plurality of LMCs.

14. The second AMF of claim 11, wherein the second message indicates that a handover is required for the wireless device.

15. The second AMF of claim 11, wherein the second message comprises an identifier of the base station as a handover target for the wireless device.

16. The second AMF of claim 11, wherein the second message comprises an identifier of a gateway mobile location center (GMLC).

17. The second AMF of claim 11, wherein the second message indicates a positioning capability of the wireless device.

18. The second AMF of claim 11, wherein the one or more positioning types comprise one or more of:
   enhanced cell identity (ECID);
   time difference of arrival (OTDOA);
   network-assisted GNSS;
   WLAN positioning;
   Bluetooth positioning;
   terrestrial beacon system (TBS) positioning; and
   barometric pressure sensor positioning.

19. The second AMF of claim 11, wherein the one or more positioning types indicate an accuracy of positioning.

20. A system, comprising:
   a second access and mobility management function (AMF), the second AMF comprising: one or more processors and memory storing instructions that, when executed by the one or more processors, cause the second AMF to:
      receive a first message comprising positioning capability information indicating that a location management component (LMC) supports one or more positioning types;
      receive, from a first AMF, a second message indicating a positioning type of a wireless device;
      determine the LMC based on:
         the positioning type; and
         the positioning capability information; and
      send, to a base station associated with the LMC, a third message comprising an identifier of the LMC; and
   the first AMF, wherein the first AMF comprises: one or more processors and memory storing instructions that, when executed by the one or more processors, cause the first AMF to send the second message indicating the positioning type of the wireless device.

* * * * *